US010167355B2

(12) United States Patent
Ajellal et al.

(10) Patent No.: US 10,167,355 B2
(45) Date of Patent: Jan. 1, 2019

(54) CATALYST SYSTEM FOR PRODUCING POLYETHYLENE COPOLYMERS IN A HIGH TEMPERATURE SOLUTION POLYMERIZATION PROCESS

(71) Applicant: BOREALIS AG, Vienna (AT)

(72) Inventors: Noureddine Ajellal, Helsinki (FI); Roberta Pellecchia, Linz (AT); Luigi Resconi, Ferrara (IT); Vyatcheslav V. Izmer, Moscow (RU); Dmitry S. Kononovich, Moscow (RU); Alexander Z. Voskoboynikov, Moscow (RU)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/304,638

(22) PCT Filed: Apr. 15, 2015

(86) PCT No.: PCT/EP2015/058204
§ 371 (c)(1),
(2) Date: Oct. 17, 2016

(87) PCT Pub. No.: WO2015/158790
PCT Pub. Date: Oct. 22, 2015

(65) Prior Publication Data
US 2017/0037165 A1  Feb. 9, 2017

(30) Foreign Application Priority Data

Apr. 17, 2014  (EP) ..................................... 14165140
Apr. 17, 2014  (EP) ..................................... 14165142

(51) Int. Cl.
C08F 4/6592 (2006.01)
C08F 4/642 (2006.01)
(Continued)

(52) U.S. Cl.
CPC .................. C08F 210/16 (2013.01)

(58) Field of Classification Search
CPC ............. C08F 4/65927; C08F 4/65912; C08F 4/65908; C08F 210/16
See application file for complete search history.

(56) References Cited

U.S. PATENT DOCUMENTS 6,252,019 B1 * 6/2001 Ewen ...................... C08F 10/00
502/117
2014/0206819 A1 * 7/2014 Hafner ................... C07C 13/465
525/240

FOREIGN PATENT DOCUMENTS

EP 2532687 A2 12/2012
WO 9714727 A1 4/1997
(Continued)

OTHER PUBLICATIONS

International Search Report and Written Opinion issued in International Application No. PCT/EP2015/058204, dated Dec. 14, 2015.
(Continued)

Primary Examiner — Caixia Lu
(74) Attorney, Agent, or Firm — Meunier Carlin & Curfman LLC

(57) ABSTRACT

Catalyst system for producing ethylene copolymers in a high temperature solution process, the catalyst system comprising (i) a metallocene complex of formula (I) wherein M is Hf or Zr X is a sigma ligand, L is a bridge of the formula $-SiR^8{}_2-$, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl n is 0, 1 or 2 $R^1$ and $R^{1'}$ are the same or can be different and can be a linear or branched $C_1$-$C_6$-alkyl group, $R^2$ and $R^{2'}$ are the same or are different and are a $CH_2$—$R^9$ group, with $R^9$ being H or linear or branched $C_1$-$C_6$-alkyl group $R^5$ and $R^{5'}$ are the same or are different and can be H or a linear or branched $C_1$-$C_6$-alkyl group or a OR group, wherein R is a $C_1$-$C_6$-alkyl group $R^6$ and $R^{6'}$ are the same or are different and can be H or a $C(R^{10})_3$ group, with $R^{10}$ being the same or different and $R^{10}$ can be H or a linear or branched $C_1$-$C_6$-alkyl group or $R^5$ and $R^6$ and/or $R^{5'}$ and $R^{6'}$ taken together form an unsubstituted 4-7 membered ring condensed to the benzene ring of the indenyl moiety, with the proviso that if $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group; and $R^7$ and $R^{7'}$ can be the same or are different and can be H or a linear or branched $C_1$-$C_6$-alkyl group (ii) an aluminoxane cocatalyst and (iii) optionally a boron containing cocatalyst.

14 Claims, No Drawings

(51) Int. Cl.
C08F 4/643 (2006.01)
C08F 210/16 (2006.01)

(56) References Cited

FOREIGN PATENT DOCUMENTS

| WO | 0009515 A1 | 2/2000 |
|---|---|---|
| WO | 03049856 A1 | 6/2003 |
| WO | 03051934 A2 | 6/2003 |
| WO | 03102042 A1 | 12/2003 |
| WO | 2006069733 A1 | 7/2006 |
| WO | 2007116034 A1 | 10/2007 |
| WO | 2007122098 A1 | 11/2007 |
| WO | 2010052260 A1 | 5/2010 |
| WO | 2010052263 A1 | 5/2010 |
| WO | 2010052264 A1 | 5/2010 |
| WO | 2011076780 A1 | 6/2011 |
| WO | 2011135004 A2 | 11/2011 |
| WO | 2012001051 A1 | 1/2012 |
| WO | 2012001052 A2 | 1/2012 |
| WO | 2012075560 A1 | 6/2012 |
| WO | 2012084961 A1 | 6/2012 |
| WO | 2013007650 A1 | 1/2013 |
| WO | 2015158791 A2 | 10/2015 |
| WO | WO 2013/007650 * | 1/2017 |

OTHER PUBLICATIONS

International Search Report and Written Opinion issued in International Application No. PCT/EP2015/058205, dated Dec. 14, 2015.
Busico, et al. "Alk-1-ene polymerization in the presence of a monocyclopentadienyl Zirconium(IV) acetamidinate catalyst: Microstructural and mechanistic insights." Macromol. Rapid Commun, vol. 28, 2007, pp. 1128-1134.
Castignolles, et al., "Detection and quantification of branching in polyacrylates by size-exclusion chromatography (SEC) and melt-state 13C NMR spectroscopy." Polymer 50 (2009) 2373-83.
Chukanova, et al., "Polymerization of propylene using isospecific rac-Me2Si(2-Me,4-Phlnd)2ZrCl2 catalyst immobilized on polyethylene with grafted poly(acrylic acid)", Polymer science. Series A, Chemistry, physics 43.8 (2001): 787-792.
Ewen, et al., "Evaluation of the dimethylsilyl-bis(2-methyl-4-phenyl-1-indenyl) ligand with group 4 triad metals in propene polymerizations with methylaluminoxane", Macromolecular Rapid Communications vol. 19, Issue 1, Jan. 1998, pp. 71-73.
Filip, et al., "Heteronuclear decoupling under fast MAS by a rotor-synchronized Hahn-echo pulse train", Journal of Magnetic Resonance, vol. 176, Issue 2, Oct. 2005, pp. 239-243.
Griffin, et al., "Low-load rotor-synchronised Hahn-echo pulse train (RS-HEPT) 1H decoupling in solid-state NMR: factors affecting MAS spin-echo dephasing times.", Mag. Res. in Chem. 2007 45, S1, S198.
Hintermann, et al., "Expedient syntheses of the N-heterocyclic carbene precursor imidazolium salts IPr•HCl, IMes•HCl and IXy•HCl", Beilstein J. Org. Chem. 2007, 3, 1-5.
Klimke, et al., "Optimisation and Application of Polyolefin Branch Quantification by Melt-State 13C NMR Spectroscopy", Macromolecular Chemistry and Physics vol. 207, Issue 4, Feb. 24, 2006, 382-395.
Liu, et al., "Poly(ethylene-co-1-octene) Characterization by High-Temperature Multidimensional NMR at 750 MHz", Macromolecules 2001, 34, 4757-4767.
Matsubara, et al., "Synthesis and Structures of Nickel Halide Complexes Bearing Mono- and Bis-coordinated N-Heterocyclic Carbene Ligands, Catalyzing Grignard Cross-Coupling Reactions", Organometallics, 2006, 25 (14), 3422-3427.
Parkinson, et al., "Effect of Branch Length on 13C NMR Relaxation Properties in Molten Poly[ethylene-co-(α-olefin)] Model Systems", Macromol. Chem. Phys. 2007, 208, 2128-2133.
Hubner, et al., "Application of Melt-State NMR Spectroscopy for Polyolefin Characterization in Industry," NMR Spectroscopy of Polymers: Innovative Strategies for Complex Macromolecules, Chapter 24, 401, 2011.
Pollard, "Observation of Chain Branching in Polyethylene in the Solid State and Melt via 13C NMR Spectroscopy and Melt NMR Relaxation Time Measurements", Macromolecules, 2004, 37 (3), pp. 813-825.
Qiu, et al., "Improved Peak Assignments for the 13C NMR Spectra of Poly(ethylene-co-1-octene)s", Macromolecules 2007, 40, 6879-6884.
Randall, A Review of High Resolution Liquid $^{13}$Carbon Nuclear Magnetic Resonance Characterizations of Ethyelene-Based Polymers. Macromol. Sci., Rev. Macromol. Chem. Phys. 1989, C29, 201-317.
Stork, et al., "The Stereochemistry of the SN2' Reaction. I. Preparation of Pure trans-6-Alkyl-2-cyclohexen-1-ols", J. Am. Chem. Soc. 1956, 78, 4604-4608.
Ushakova, et al., Ethylene polymerization and ethylene-1-hexene copolymerization over immobilized metallocene catalysts, Kinetics and Catalysis, Feb. 2012, vol. 53, Issue 1, 75-83.
Wang, et al., "Long Chain Branching in Ethylene Polymerization Using Binary Homogeneous Metallocene Catalyst System", Polymer Reaction Engineering , vol. 7, 1999—Issue 3, 327-346.
Zhou, et al., "A new decoupling method for accurate quantification of polyethylene copolymer composition and triad sequence distribution with 13C NMR." J Magn Reson., 2007, 187(2), 225-33.
Non-Final Office Action dated Jul. 19, 2017 in U.S. Appl. No. 15/304,629.

* cited by examiner

CATALYST SYSTEM FOR PRODUCING POLYETHYLENE COPOLYMERS IN A HIGH TEMPERATURE SOLUTION POLYMERIZATION PROCESS

The present invention is related to improved catalyst systems, which are able to produce polyethylene copolymers in a high temperature solution polymerization process. The catalyst systems comprise a combination of selected bisindenyl metallocene complexes, substituted at least in position 2 and 4 of both indenyls along with cocatalyst mixture comprising an aluminoxane cocatalyst and optionally additionally a boron based cocatalyst. These combinations remarkably give rise to catalyst systems with excellent activity, productivity and stability and allow production of polyethylene copolymers with increased comonomer incorporation.

Metallocene catalysts have been used to manufacture polyolefins for many years. Countless academic and patent publications describe the use of these catalysts in olefin polymerization. Metallocenes are now used industrially and polyethylenes and in particular polypropylenes are often produced using cyclopentadienyl based catalyst systems with different substitution patterns.

Several of these metallocene catalysts have been described for the use in solution polymerization in particular for producing polypropylene.

For example WO 2007/116034 describes i.a. a catalyst system comprising racemic dimethylsilylbis(2-methyl-4-phenyl-5-methoxy-6-tert-butylinden-1-yl)dichlorozirconium and methylalumoxane cocatalyst for producing polypropylene in a solution polymerization process at temperatures between 100° C. and 120° C.

It is mentioned that the metallocene compounds can also be used for preparing ethylene copolymers, preferably ethylene-butene copolymers, but it is said that such copolymers are obtained by using gas phase processes.

Also WO 2007/122098 describes the use of the complex racemic dimethylsilylbis(2-methyl-4-(4-tert-butylphenyl)-1,5,6,7-tetrahydro-s-indacen-1-yl)dichlorozirconium in combination with an alumoxane cocatalyst for producing ethylene copolymers at 100° C.

EP 2532687 A describes further metallocene complexes, like dimethylsilanediylbis[2-methyl-4-(3,5-di-tert-butylphenyl)-7-methoxy-indenyl]zirconiumdichloride, which is first pre-alkylated with an aluminium alkyl compound and then activated with borate cocatalyst. The catalyst system is used for preparing polypropylene at a temperature between 30° C. to 70° C.

WO 2011/135004 complexes as described in WO 2007/116034, like racemic dimethylsilylbis(2-methyl-4-phenyl-5-methoxy-6-tert-butylinden-1-yl)dichlorozirconium and prepared according to the emulsion/solidification method as described in WO 2003/051934 are disclosed. These complexes are activated with an alumoxane cocatalyst and used for propylene polymerization.

WO 2012/075560 further describes a multi stage (at least two stage) solution polymerization process for preparing ethylene copolymers, wherein a phosphinimine catalyst is used with a cocatalyst comprising an alkylaluminoxane and an ionic activator, like a boron compound.

In none of the above cited literatures the problem of effective comonomer incorporation is mentioned.

However, for a process for producing ethylene copolymers to be efficient, it is important that the catalyst system used has a high reactivity for the C4-10 alpha-olefins used as comonomer.

Drawbacks arising from a low reactivity for the C4-10 alpha-olefin comonomer are e.g. increasing amounts of the alpha-olefin comonomer that are needed for introducing a certain amount of higher alpha-olefin comonomer units into the polymer and/or removal of non-reacted higher alpha-olefin from the polymer powder.

A further important and desired property of the catalyst system used is a high productivity in order to get a maximum of polyethylene produced with as low amount of catalyst as possible. One further point to be noted is that high-temperature solution processes for olefin polymerization require a thermally robust catalyst.

As is discussed in WO 2003/102042 solution processes are characterized by short residence times. Consequently, in addition to having temperature stability, the catalyst systems used in these processes must activate quickly and thoroughly. This contrasts sharply with the requirements for catalysts used in slurry and gas-phase processes, where residence times are longer and catalyst lifetime is more important. Thus, a catalyst that is valuable for slurry and gas-phase processes might be a poor choice for use in a high-temperature solution process, and vice-versa. As solution to this problem WO 2003/102042 suggests to use organometallic complexes having Group 3-10 transition metal and a bridged indeno-indolyl ligand in combination with an activator, which is preferably methylalumoxane.

Although a lot of work has been done in the field of metallocene catalysts, there still remain some problems, which relate especially to the productivity or activity of the catalyst systems when used in a high temperature solution polymerization process. The productivity or activity has been found to be relatively low.

There remains a need therefore to find new catalyst systems for ethylene copolymerization in a high temperature solution polymerization process, which are able to produce the ethylene copolymers with desired properties and which have high activity and/or productivity as well as high reactivity for the used comonomers in order to achieve high comonomer incorporation and high thermal stability.

As a consequence, the inventors set out to develop a new/improved catalyst system having superior polymerization behaviour than the above mentioned polymerization catalyst systems regarding to productivity, comonomer incorporation and thermal stability.

The present inventors have now found improved catalyst systems, which are able to solve the problems disclosed above. In particular, the invention combines the use of special metallocene complexes with aluminoxane cocatalysts and optionally in addition a boron based cocatalyst in a high temperature solution polymerization process for producing ethylene copolymers.

SUMMARY OF INVENTION

Thus, viewed from one aspect the invention relates to a catalyst system for producing ethylene copolymers in a high temperature solution process, the catalyst system comprising
(i) a metallocene complex of formula (I)

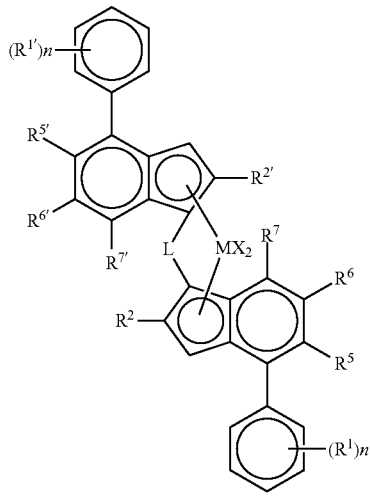

(I)

wherein
M is Hf or Zr
X is a sigma ligand
L is a bridge of the formula —$SiR^8{}_2$—, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl,
n is 0, 1 or 2,
$R^1$ and $R^{1'}$ are the same or can be different and can be a linear or branched $C_1$-$C_6$-alkyl group,
$R^2$ and $R^{2'}$ are the same or can be different and are a $CH_2$—$R^9$ group, with $R^9$ being H or linear or branched $C_1$-$C_6$-alkyl group
$R^5$ and $R^{5'}$ are the same or are different and can be H or a linear or branched $C_1$-$C_6$-alkyl group or a OR group, wherein R is a $C_1$-$C_6$-alkyl group
$R^6$ and $R^{6'}$ are the same or are different and can be H or a $C(R^{10})_3$ group, with $R^{10}$ being the same or different and $R^{10}$ can be H or a linear or branched $C_1$-$C_6$-alkyl group
or $R^5$ and $R^6$ and/or $R^{5'}$ and $R^{6'}$ taken together form an unsubstituted 4-7 membered ring condensed to the benzene ring of the indenyl moiety,
with the proviso that if $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group; and
$R^7$ and $R^{7'}$ can be the same or are different and can be H or a linear or branched $C_1$-$C_6$-alkyl group (ii) an aluminoxane cocatalyst and
(iii) optionally a boron containing cocatalyst.

Viewed from another aspect the invention provides a new class of metallocenes of formula (I), wherein
M is Zr,
X is Cl or methyl group,
L is a bridge of the formula —$SiR^8{}_2$—, wherein both $R^8$ are the same $C_1$-$C_4$-hydrocarbyl or $C_6$-aryl group,
$R^1$ and $R^{1'}$ are the same and are a linear or branched $C_1$-$C_4$-alkyl group,
n is 1 or 2,
$R^2$ and $R^{2'}$ are the same and are a $CH_2$—$R^9$ group, with $R^9$ being H or a $C_1$-$C_3$-alkyl group, one of $R^5$ and $R^6$ or $R^{5'}$ and $R^{6'}$ form together an unsubstituted 5-6 membered ring condensed to the benzene ring of the indenyl moiety,
and the remaining residues of $R^5$ and $R^6$ or $R^{5'}$ and $R^{6'}$, are for $R^5$ or $R^{5'}$ a OR group,
wherein R is a $C_1$-$C_4$-alkyl group and for $R^6$ or $R^{6'}$ a $C(R^{10})_3$ group, with $R^{10}$ being the same and $R^{10}$ can be a $C_1$-$C_2$-alkyl group,
$R^7$ and $R^{7'}$ are both H
which are suitable for being used in the present invention.

Viewed from yet another aspect the invention provides a process for the preparation of an ethylene copolymer comprising polymerizing ethylene and a $C_{4-10}$ alpha-olefin comonomer in a high temperature solution process at a temperature greater than 100° C. in the presence of a catalyst comprising:
(i) a metallocene complex of formula (I) as defined above
(ii) an aluminoxane cocatalyst and
(iii) optionally a boron containing cocatalyst.

Viewed from a further aspect the invention provides an ethylene copolymer made by a process as hereinbefore defined.

DETAILED DESCRIPTION OF THE INVENTION

Metallocene Complex

The single site metallocene complex, especially the complexes defined by the formula (I) specified in the present invention, used for manufacture of the ethylene copolymer are symmetrical or asymmetrical. For asymmetrical complexes that means that the two indenyl ligands forming the metallocene complex are different, that is, each indenyl ligand bears a set of substituents that are either chemically different, or located in different positions with respect to the other indenyl ligand. More precisely, they are chiral, racemic bridged bisindenyl metallocene complexes.

Whilst the complexes of the invention may be in their syn configuration, ideally they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the FIGURE below.

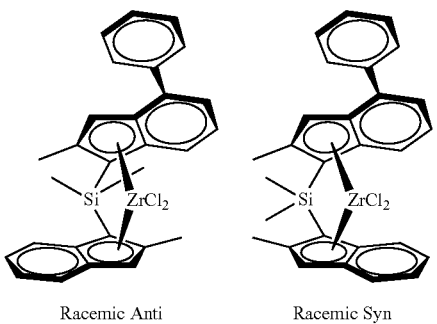

Racemic Anti      Racemic Syn

Formula (I) is intended to cover both syn and anti configurations.

By nature of their chemistry, both anti and syn enantiomer pairs are formed during the synthesis of the complexes. However, by using the ligands of this invention, separation of the preferred anti isomers from the syn isomers is straightforward.

It is preferred if the metallocene complexes of the invention are employed as the rac anti isomer. Ideally therefore at least 95% mol, such as at least 98% mol, especially at least 99% mol of the metallocene catalyst is in the racemic anti isomeric form.

The invention can be effected with a metallocene complex of formula (I)

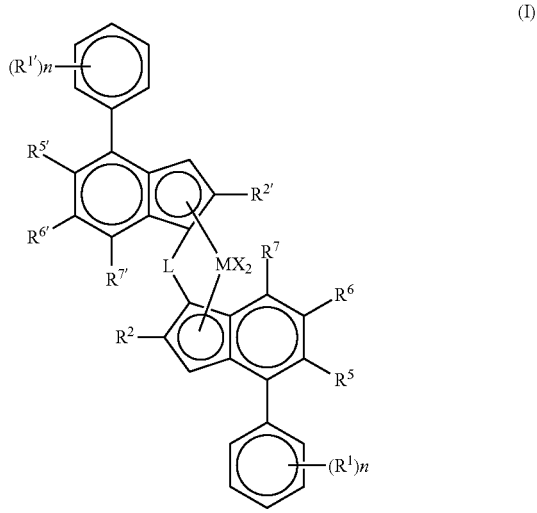

(I)

wherein

M is Hf or Zr

X is a sigma ligand,

L is a bridge of the formula —$SiR^8{}_2$—, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl n is 0, 1 or 2

$R^1$ and $R^{1'}$ are the same or can be different and can be a linear or branched $C_1$-$C_6$-alkyl group, $R^2$ and $R^{2'}$ are the same or can be different and are a $CH_2$—$R^9$ group, with $R^9$ being H or linear or branched $C_1$-$C_6$-alkyl group, $R^5$ and $R^{5'}$ are the same or are different and can be H or a linear or branched $C_1$-$C_6$-alkyl group or a OR group, wherein R is a $C_1$-$C_6$-alkyl group, $R^6$ and $R^{6'}$ are the same or are different and can be H or a $C(R^{10})_3$ group, with $R^{10}$ being the same or different and $R^{10}$ can be H or a linear or branched $C_1$-$C_6$-alkyl group or $R^5$ and $R^6$ and/or $R^{5'}$ and $R^{6'}$ taken together form an unsubstituted 4-7 membered ring condensed to the benzene ring of the indenyl moiety, with the proviso that if $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group;

and $R^7$ and $R^{7'}$ can be the same or are different and can be H or a linear or branched $C_1$-$C_6$-alkyl group In the formula (I) each X, which may be the same or different, is a sigma ligand, preferably a hydrogen atom, a halogen atom, a $R^{11}$, $OR^{11}$, $OSO_2CF_3$, $OCOR^{11}$, $SR^{11}$, $NR^{11}{}_2$ or $PR^{11}{}_2$ group wherein $R^{11}$ is a linear or branched, cyclic or acyclic, $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl or $C_7$-$C_{20}$-arylalkyl radical; optionally containing heteroatoms belonging to groups 14-16 or is $SiR^{11}{}_3$, $SiHR^{11}{}_2$ or $SiH_2R^{11}$. $R^{11}$ is preferably a $C_{1-6}$-alkyl, phenyl or benzyl group, whereby the term halogen includes fluoro, chloro, bromo and iodo groups, preferably chloro groups.

More preferably each X is independently a hydrogen atom, a halogen atom, $C_{1-6}$-alkoxy group or an $R^{11}$ group, e.g. preferably a $C_{1-6}$-alkyl, phenyl or benzyl group.

Most preferably X is chlorine or a methyl radical. Preferably both X groups are the same.

n is 0, 1 or 2

$R^1$ and $R^{1'}$ can be a linear or branched $C_1$-$C_6$-alkyl group, like methyl, ethyl, n-propyl, i-propyl, n-butyl or tert.-butyl.

Preferably $R^1$ and $R^{1'}$ are the same and are a linear or branched $C_1$-$C_6$-alkyl group, more preferably a linear or branched $C_2$-$C_6$-alkyl group, more preferably a linear or branched butyl-group and most preferably $R^1$ and $R^{1'}$ are tert.-butyl.

In a preferred embodiment at least one of the phenyl groups is substituted with at least one of $R^1$ or $R^{1'}$, thus n can be 0 only for one of the ligands and not for both.

If n is 1, then $R^1$ and $R^{1'}$ are preferably on position 4 (para) of the phenyl ring and if n is 2 then $R^1$ and $R^{1'}$ are preferably on positions 3 and 5 of the phenyl ring.

Different combinations for $R^1$ and $R^{1'}$ are possible:

Both phenyl rings are substituted by $R^1$ and $R^{1'}$, whereby n can be the same or can be different for the two phenyl rings and is 1 or 2.

Only one of the phenyl rings is substituted, whereby n is 1 or 2, preferably 1.

$R^2$ and $R^{2'}$ are the same or can be different and are a $CH_2$—$R^9$ group, with $R^9$ being H or linear or branched $C_1$-$C_6$-alkyl group, like methyl, ethyl, n-propyl, i-propyl, n-butyl, i-butyl, sec.-butyl and tert.-butyl. Preferably $R^2$ and $R^{2'}$ are the same and are a $CH_2$—$R^8$ group, with $R^9$ being H or linear or branched $C_1$-$C_4$-alkyl group, more preferably $R^2$ and $R^{2'}$ are the same and are a $CH_2$—$R^9$ group, with $R^9$ being H or linear or branched $C_1$-$C_3$-alkyl group and most preferably $R^2$ and $R^{2'}$ are either both methyl or both i-butyl.

$R^5$ and $R^{5'}$ are the same or are different and can be H or a linear or branched $C_1$-$C_6$-alkyl group or a OR group, wherein R is a linear or branched $C_1$-$C_6$-alkyl group, and $R^6$ and $R^{6'}$ are the same or are different and can be a H or a $C(R^{10})_3$ group, with $R^{10}$ being the same or different and $R^{10}$ can be H or a linear or branched $C_1$-$C_6$-alkyl group, or $R^5$ and $R^6$ and/or $R^{5'}$ and $R^{6'}$ taken together form an unsubstituted 4-7, preferably 5-6 membered ring condensed to the benzene ring of the indenyl moiety, with the proviso that if $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group.

If one of $R^5$ and $R^6$ or $R^{5'}$ and $R^{6'}$ together form an unsubstituted 4-7, preferably 5-6 membered ring condensed to the benzene ring of the indenyl moiety, then the substituents on the other indenyl moiety (either $R^5$ and $R^6$ or $R^{5'}$ and $R^{6'}$) are preferably (for $R^5$ or $R^{5'}$) a OR group wherein R is a linear or branched $C_1$-$C_6$-alkyl group, like methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably a $C_1$-alkyl group and (for $R^6$ or $R^{6'}$) a $C(R^{10})_3$ group, with $R^{10}$ being the same or different and $R^{10}$ can be H or a linear or branched $C_1$-$C_6$-alkyl group, preferably with $R^{10}$ being the same or different and $R^{10}$ being a linear or branched $C_1$-$C_4$-alkyl group, more preferably with $R^{10}$ being the same and $R^{10}$ being a $C_1$-$C_2$-alkyl group, most preferably the $C(R^{10})_3$ group is a tert.-butyl group.

In one embodiment both of $R^5$ and $R^6$ as well as $R^{5'}$ and $R^{6'}$ together form an unsubstituted 4-7, preferably 5-6 membered ring condensed to the benzene ring of the indenyl moiety. More preferably both of $R^5$ and $R^6$ as well as $R^{5'}$ and $R^{6'}$ form an unsubstituted 5 membered ring condensed to the benzene ring of the indenyl moiety, with the proviso that if $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group.

Surprisingly the inventors have found that complexes wherein both of $R^5$ and $R^6$ as well as $R^{5'}$ and $R^{6'}$ form an unsubstituted 5 membered ring condensed to the benzene ring of the indenyl moiety and $R^2$ and $R^{2'}$ are not a $C_1$-alkyl group show extremely high comonomer incorporation also if used without the additional boron cocatalyst.

In another embodiment it is also possible that at both ligands $R^5$ and $R^6$ as well as $R^{5'}$ and $R^{6'}$ are hydrogen.

Still a further possibility is that only one of the ligands is unsubstituted in position 5 and 6.

$R^7$ and $R^{7'}$ can be the same or are different and can be H or a linear or branched $C_1$-$C_6$-alkyl group, preferably $R^7$ and $R^{7'}$ are the same or are different and can be H or a linear or branched $C_1$-$C_4$-alkyl group and more preferably $R^7$ and $R^{7'}$ are the same or are different and can be H or a $C_1$-$C_2$-alkyl group.

For preferred complexes $R^7$ and $R^{7'}$ are the same and are both H, or for a further class of preferred complexes one of $R^7$ or $R^{7'}$ is a linear or branched $C_1$-$C_6$-alkyl group, preferably a linear or branched $C_1$-$C_4$-alkyl group and more preferably a $C_1$-$C_2$-alkyl group and the other is H.

L is a bridge of the formula —$SiR^8_2$—, wherein each $R^8$ is independently a $C_1$-$C_{20}$-hydrocarbyl, tri($C_1$-$C_{20}$-alkyl) silyl, $C_6$-$C_{20}$-aryl, $C_7$-$C_{20}$-arylalkyl or $C_7$-$C_{20}$-alkylaryl.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups. Preferably $R^8$ are the same and are a $C_1$-$C_{10}$-hydrocarbyl or $C_6$-$C_{10}$-aryl group, like methyl, ethyl, propyl, isopropyl, tertbutyl, isobutyl, $C_{5-6}$-cycloalkyl, cyclohexylmethyl, phenyl or benzyl, more preferably both $R^8$ are a $C_1$-$C_4$-hydrocarbyl or $C_6$-aryl group and most preferably both $R^8$ are a $C_1$-alkyl group.

Especially preferred complexes of formula (I) are racemic dimethylsilanediylbis[2-iso-butyl-4-(4-tert-butylphenyl)-5,6,7-trihydro-s-indacen-1-yl]zirconium dichloride or dimethyl, racemic dimethylsilanediyl-[$\eta^5$-6-tert-butyl-4-(3,5-di-tert-butylphenyl)-5-methoxy-2-methylinden-1-yl]-[$\eta^5$-4-(3,5-di-tert-butylphenyl)-2-methyl-5,6,7-trihydro-s-indacen-1-yl]zirconium dichloride or dimethyl, dimethylsilanediylbis[2-methyl-4-(4'-tert-butylphenyl)-5,6,7-trihydro-s-indacen-1-yl] zirconium dichloride or dimethyl, dimethylsilanediylbis[2-methyl-4-(3,5-di-tert-butylphenyl)-5,6,7-trihydro-s-indacen-1-yl]zirconium dichloride or dimethyl, racemic dimethylsilyl[(2-methyl-4-phenyl-5-methoxy-6-tert-butylinden-1-yl)-(2-methyl-4-phenyl-inden-1-yl)] zirconium dichloride or dimethyl, either in their syn or anti configuration.

For the purpose of this invention, the terms dimethylsilyl, dimethylsilanediyl and dimethylsililene are equivalent.

The metallocenes of formula (I) as described above include a new class of metallocenes, which are suitable for being used in the present invention, wherein in the formula (I)

M is Zr,

X is Cl or a methyl group

L is a bridge of the formula —$SiR^8_2$—, wherein both $R^8$ are the same $C_1$-$C_4$-hydrocarbyl or $C_6$-aryl group, $R^1$ and $R^{1'}$ are the same and are a linear or branched $C_1$-$C_4$-alkyl group, n is 1 or 2, $R^2$ and $R^{2'}$ are the same and are a $CH_2$—$R^9$ group, with $R^9$ being H or a $C_1$-$C_3$-alkyl group, one of $R^5$ and $R^6$ or $R^{5'}$ and $R^{6'}$ form together an unsubstituted 5-6 membered ring condensed to the benzene ring of the indenyl moiety, and the remaining residues of $R^5$ and $R^6$ or $R^{5'}$ and $R^6$, are for $R^5$ or $R^{5'}$ a OR group, wherein R is a $C_1$-$C_4$-alkyl group and for $R^6$ or $R^{6'}$ a $C(R^{10})_3$ group, with $R^{10}$ being the same and $R^{10}$ can be a $C_1$-$C_2$-alkyl group.

This new class of metallocenes is a further embodiment of the invention.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in WO2002/02576, WO2011/135004, WO2012/084961, WO2012/001052 and WO2011/076780.

Cocatalyst

To form an active catalytic species it is normally necessary to employ a cocatalyst as is well known in the art. The present invention requires the use of an aluminoxane cocatalyst and an optionally an additional boron containing cocatalyst.

The aluminoxane cocatalyst can be one of formula (II):

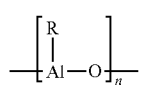 (II)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10 alkyl, preferably C1-C5 alkyl, or C3-10-cycloalkyl, C7-C12-arylalkyl or alkylaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (I).

The preferred aluminoxane in the process according to the invention is methylaluminoxane (MAO). Since the aluminoxanes used according to the invention as cocatalysts are not, owing to their mode of preparation, pure compounds, the molarity of aluminoxane solutions hereinafter is based on their aluminium content.

It has been surprisingly found however, that in the context of heterogeneous catalysis, where catalysts are not supported on any external carrier or supported as described above, that in specific cases higher activities can be achieved if a boron based cocatalyst is also employed as a cocatalyst. It will be appreciated by the skilled man that where boron based cocatalysts are employed, it is normal to preactivate the complex by reaction thereof with an aluminium alkyl compound, such as TIBA. This procedure is well known and any suitable aluminium alkyl, preferably an aluminium alkyl compounds of the formula (VIII) $AlR_3$ with R being a linear or branched $C_2$-$C_8$-alkyl group, can be used.

Preferred aluminium alkyl compounds are triethylaluminium, tri-isobutylaluminium, tri-isohexylaluminium, tri-n-octylaluminium and tri-isooctylaluminium.

The present invention includes preferably the use of boron cocatalysts together with aluminoxanes rather than the combination of these simple aluminium alkyls and boron cocatalysts.

Boron based cocatalysts of interest include boron compounds containing a borate $3^+$ ion, i.e. borate compounds. These compounds generally contain an anion of formula:

$(Z)_4B^-$ (III)

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a non-coordinating anion such as tetrakis(pentafluorophenyl)borate.

Suitable counterions are protonated amine or aniline derivatives or phosphonium ions. These may have the general formula (IV) or (V):

$NQ_4^+$ (IV)

or $PQ_4^+$ (V)

where Q is independently H, $C_{1-6}$-alkyl, $C_{3-8}$ cycloakyl, phenyl$C_{1-6}$-alkylene- or optionally substituted Ph. Optional substituents may be C1-6-alkyl, halo or nitro. There may be one or more than one such substituent. Preferred substituted Ph groups include therefore para-substituted phenyl, preferably tolyl or dimethylphenyl.

It is preferred if at least one Q group is H, thus preferred compounds are those of formula:

$NHQ_3^+$ (VI)

or $PHQ_3^+$ (VII)

Preferred phenyl-$C_{1-6}$-alkyl-groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium.

A more preferred counterion is trityl ($CPh_3^+$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include:
tributylammoniumtetra(pentafluorophenyl)borate,
tributylammoniumtetra(trifluoromethylphenyl)borate,
tributylammoniumtetra-(4-fluorophenyl)borate,
N,N-dimethylcyclohexylammoniumtetrakis-(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakis(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate,
N,N-dimethylbenzylammoniumtetrakis(pentafluorophenyl) borate or
N,N-dimethylaniliniumtetrakis(pentafluorophenyl)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

In one embodiment, preferably both cocatalysts, an aluminoxane and a boron based cocatalyst, are used in the catalyst system of the present invention.

In a further embodiment, if a complex is used, wherein both of $R^5$ and $R^6$ as well as $R^{5'}$ and $R^{6'}$ form an unsubstituted 5 membered ring condensed to the benzene ring of the indenyl moiety, it is also preferred to use only aluminoxane as cocatalyst.

It is also possible to add an aluminium alkyl compounds of the formula (VIII) AlR$_3$ with R being a linear or branched C$_2$-C$_8$-alkyl group as acid scavengers in amounts known to the art skilled person.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The metallocene complex of the present invention is used in combination with the cocatalyst(s) as a catalyst system for the polymerization of ethylene and C$_{4-10}$ alpha-olefin comonomer in a high temperature solution polymerization process.

The catalyst system of the invention can be used in non-supported form or in solid form. The catalyst system of the invention may be used as a homogeneous catalyst or heterogeneous catalyst.

The catalyst system of the invention in solid form, preferably in solid particulate form is free from an external carrier, however still being in solid form.

By free from an external carrier is meant that the catalyst does not contain an external support, such as an inorganic support, for example, silica or alumina, or an organic polymeric support material.

a) Non-supported

Non-supported catalyst systems, suitable for the present invention can be prepared in solution, for example in an aromatic solvent like toluene, by contacting the metallocene (as a solid or as a solution) with the cocatalyst(s), for example methylaluminoxane and/or a borane or a borate salt previously in an aromatic solvent, or can be prepared by sequentially adding the dissolved catalyst components to the polymerization medium.

b) Solid Form

In an alternative embodiment, in order to provide the catalyst system of the invention in solid form but without using an external carrier, it is preferred if a liquid/liquid emulsion system is used. The process involves forming dispersing catalyst components (i) (the complex) and (ii) + optionally (iii) the cocatalysts) in a solvent, and solidifying said dispersed droplets to form solid particles.

In the present case, if aluminoxan as well as boron based cocatalysts are used, it is particularly preferred if the aluminoxane is contacted with the metallocene before the borate is added. Both cocatalyst components and the metallocene are preferably present in one solution.

In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles.

Full disclosure of the necessary process steps can be found in WO03/051934 which is herein incorporated by reference.

All or part of the preparation steps can be done in a continuous manner. Reference is made to WO2006/069733 describing principles of such a continuous or semicontinuous preparation methods of the solid catalyst types, prepared via emulsion/solidification method.

The formed catalyst preferably has good stability/kinetics in terms of longevity of reaction, high activity and the catalysts enable low ash contents.

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

Use of the catalyst prepolymerization step offers the advantage of minimising leaching of catalyst components and thus local overheating.

Polymer

The polymer to be produced using the catalyst system of the invention is copolymer of ethylene and a C$_{4-10}$ alpha-olefin comonomer, like 1-butene, 1-hexene, 4-methyl-1-pentene, 1-octene etc. Preferably butene, hexene or octene and more preferably octene is used as comonomer.

The comonomer content in such a polymer may be up to 40 wt %, preferably between 5 to 40 wt %, more preferably 10 to 38 wt % and more preferable 15 to 36 wt %.

The density (measured according to ISO 1183-187) of the polymers is in the range of 0.850 g/cm$^3$ to 0.950 g/cm$^3$, preferably in the range of 0.850 g/cm$^3$ to 0.945 g/cm$^3$ and more preferably in the range of 0.850 g/cm$^3$ to 0.940 g/cm$^3$.

Mw/Mn value of the polymers of the invention is less than 5, e.g. in the range of 2.0 to 4.5.

The melting points (measured with DSC according to ISO 11357-3:1999) of the polymers to be produced are below 130° C., preferably below 120° C., more preferably below 110° C. and most preferably below 100° C.

Polymerization

The catalyst system of the present invention is used to produce the above defined ethylene copolymers in a high temperature solution polymerization process at temperatures higher than 100° C.

In view of this invention such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

A solution polymerization process is known for its short reactor residence times (compared to Gas-phase or slurry processes) allowing, thus, very fast grade transitions and significant flexibility in producing a wide product range in a short production cycle.

According to the present invention the used solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in the used solution polymerization process according to the invention is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

A known solution technology suitable for the process according to the invention is the COMPACT technology.

Advantage

The new catalyst systems, comprising component (i), (ii) and optionally (iii) can be advantageously used for ethylene copolymerization in high temperature solution polymerization process.

The catalyst systems according to the present invention show excellent productivity, excellent comonomer incorporation and thermal stability if used for ethylene copolymerization in high temperature solution polymerization process.

Applications

The polymers made by the catalyst system of the invention are useful in all kinds of end articles such as pipes, films (cast, blown films), fibers, moulded articles (e.g. injection moulded, blow moulded, rotomoulded articles), extrusion coatings and so on.

The invention will now be illustrated by reference to the following non-limiting examples

EXAMPLES

Methods

Al and Zr Determination (ICP-method)

The elemental analysis of a catalyst was performed by taking a solid sample of mass, m. The catalyst was deactivated by substituting the inert storing conditions with ambient air, first passively through a needle and the actively by applying vacuum three times to the sampling container. Samples were dissolved to a volume V by first cooling on dry ice while adding freshly deionised water (5% of V) and nitric acid ($HNO_3$, 65%, 5% of V). The samples were transferred in full to volumetric flasks using deionised water and rinsing the sampling containers. Hydrofluoric acid (HF, 40%, 3% of V) was added to the volumetric flasks and volume V obtained by addition of freshly deionised water. The prepared sample solutions were left to stabilise for two hours.

The analysis was run at room temperature using a Thermo Elemental iCAP 6300 Inductively Coupled Plasma-Optical Emission Spectrometer (ICP-OES) which was calibrated using a blank (a solution of 5% HNO3, 5% HF in deionised water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of B and P in solutions of 5% HNO3, 3% HF in deionised water.

Immediately before analysis the calibration is 'resloped' using the blank and 100 ppm Al, 50 ppm B, P standard, a quality control sample (20 ppm Al, 5 ppm B, P in a solution of 5% HNO3, 3% HF in DI water) is run to confirm the reslope. The QC sample is also run after every 5th sample and at the end of a scheduled analysis set.

The reported values are an average of three successive aliquots taken from the same sample and are related back to the original catalyst by inputting the original mass of sample, m, and the dilution volume, V, into the software.

DSC Analysis

The melting point ($T_m$) and crystallization temperature ($T_c$) were determined on a DSC200 TA instrument, by placing a 5-7 mg polymer sample, into a closed DSC aluminum pan, heating the sample from −30° C. to 180° C. at 10° C./min, holding for 5 min at 180° C., cooling from 180° C. to −30° C., holding for 5 min at −30° C., heating from −30° C. to 180° C. at 10° C./min. The reported $T_m$ is the maximum of the curve from the second heating scan and $T_c$ is the maximum of the curve of the cooling scan.

Quantification of Comonomer Content by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {klimke06, parkinson07, castignolles09, parkinson11} Standard single-pulse excitation was employed utilising the transient NOE at short recycle delays of 3 s {pollard04, klimke06} and the RS-HEPT decoupling scheme{fillip05,griffin07}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-octene were observed (randall89, liu01, qiu07) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.32 ppm. This integral is assigned to the unresolved signals corresponding to both $*B6$ and $*\beta B6B6$ sites of isolated (EEOEE) and isolated double non-consecutive (EEOEOEE) 1-octene sequences respectively. To compensate for the influence of the two $*\beta B6B6$ sites the integral of the $\beta\beta B6B6$ site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.48 ppm assigned to the $\alpha\alpha B6B6$ sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the $\beta\beta B6B6$ sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the $\alpha\alpha\gamma B6B6B6$ sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (1/2)*(I_{2S+2B6} + I_{3S+3B6} - 2*O_{total})$$

The ethylene comonomer content was quantified using the integral of the bulk methylene (bulk) signals at 30.00 ppm. This integral included the $\gamma$ and 4B6 sites from 1-octene as well as the $\delta^+$ sites. The total ethylene comonomer content was calculated based on the bulk integral and compensating for the observed 1-octene sequences and end-groups:

$$E_{total} = (1/2)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total})/(E_{total} + O_{total})$$

The total comonomer incorporation of 1-octene in weight percent was calculated from the mole fraction in the standard manner:

$$O\ [wt\ \%] = 100*(fO*112.21)/((fO*112.21) + ((1-fO)*28.05))$$

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
parkinson11
NMR Spectroscopy of Polymers: Innovative Strategies for Complex Macromolecules, Chapter 24, 401 (2011)
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
randall89
J. Randall, Macromol. Sci., Rev. Macromol. Chem. Phys. 1989, C29, 201.
qui07
Qiu, X., Redwine, D., Gobbi, G., Nuamthanom, A., Rinaldi, P., Macromolecules 2007, 40, 6879
liu01
Liu, W., Rinaldi, P., McIntosh, L., Quirk, P., Macromolecules 2001, 34, 4757
GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2× GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were 50 prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Chemicals

MAO was purchased from Chemtura and used as a 30 wt-% solution in toluene.

Triphenylcarbeniumtetrakis(pentafluorophenyl)borate (alternative name trityl tetrakis-(pentafluorophenyl)borate) (CAS 136040-19-2) was purchased from Acros (tritylBF20)

1-octene as co-monomer (99%, Sigma Aldrich) was dried over molecular sieves and degassed with nitrogen before use.

Heptane and decane (99.9%, Sigma Aldrich) were dried under molecular sieves and degassed with nitrogen before use.

Examples

For the purpose of this invention, the terms dimethylsilyl, dimethylsilanediyl and dimethylsililene are equivalent.

Complex Preparation

1. Complex 1-Zr: anti-dimethylsilylene(2-methyl-4-phenyl-5-methoxy-6-tert-butyl-indenyl)(2-methyl-4-(4-tert-butyl-phenyl)indenyl)zirconium dichloride (C1-Zr) was prepared as described in the patent application WO2013/007650A1

2. Complex 2-Zr: racemic dimethylsilyl-(2-methyl-4-(3,5-di-tert.-butylphenyl)-5-methoxy-6-tert-butylinden-1-yl)-(2-methyl-4-(3,5-di-tert-butylphenyl)-1,5,6,7-tetrahydro-s-indacen-1-yl dichlorozirconium (C2-Zr) is prepared as described below:

General Procedure for C2-Zr 1-tert-Butyl-2-methoxybenzene was synthesized via alkylation of 2-tert-butylphenol (Acros) by dimethylsulfate (Merck) in the presence of aqueous NaOH (Reachim, Russia) as described in [Stork, G.; White, W. N. *J. Am. Chem. Soc.* 1956, 78, 4604.]. 2-methyl-4-bromo-5-methoxy-6-tert-butylindanone was prepared as described in WO2013007650. Bis(2,6-diisopropylphenyl)imidazolium chloride, i.e. IPr(HCl), and (IPr)NiCl$_2$(PPh$_3$) were synthesized as described in [Hintermann, L. *Beilstein J. Org. Chem.* 2007, 3, 1.] and [Matsubara, K.; Ueno, K.; Shibata, Y. *Organometallics* 2006, 25, 3422.], respectively. Anisole (Acros), 3-methylanisole (Acros), tert-Butyltoluene (Aldrich), P$_4$O$_{10}$ (Reachim), Pd(P$^t$Bu$_3$)$_2$(Strem), 1.0 M ZnCl$_2$ in THF (Aldrich), 1.0 M 3,5-di-tert-butylphenylmagnesium bromide in THF (Aldrich), hexanes (Reachim, Russia), N-bromosuccinimide (Acros), dry ethanol (Merck), diethyl methylmalonate (Aldrich), methyl iodide (Acros), acetone (Reachim, Russia), tetraethylammonium iodide (Acros), 1-Bromo-4-tert-butylbenzene (Acros), CuCN (Merck), methanesulfonic acid (Aldrich), sodium tetraphenylborate (Aldrich), palladium acetate (Aldrich), copper cyanide (Merck), lithium aluminiumhydride (Aldrich), bromobenzene (Acros), 2.5 M $^n$BuLi in hexanes (Chemetall), ZrCl$_4$ (THF)$_2$ (Aldrich), NaBH$_4$ (Aldrich), Ni(OAc)$_2$ (Aldrich), silica gel 60 (40-63 um, Merck), AlCl$_3$ (Merck), bromine (Merck), benzoyl peroxide (Aldrich), iodine (Merck), NaHCO$_3$ (Merck), Na$_2$CO$_3$ (Merck), K$_2$CO$_3$ (Merck), Na$_2$SO$_4$ (Merck), Na$_2$SO$_3$ (Merck), sodium metal (Merck), thionyl chloride (Merck), magnesium turnings (Acros), sodium acetate, trihydrate (Merck), tetraethylammonium iodide (Acros), triphenylphosphine (Acros), KOH (Merck), Na$_2$SO$_4$ (Akzo Nobel), TsOH (Aldrich), 12 M HCl (Reachim, Russia), methanol (Merck), anhydrous ethanol (Merck), CDCl$_3$ and DMSO-d$_6$ (Deutero GmbH) as well as hexanes (Merck), carbon tetrachloride (Merck), ether (Merck), ethyl acetate (Merck), toluene (Merck) and CH$_2$Cl$_2$ (Merck) for extractions were used as received. Tetrahydrofurane (Merck), ether (Merck), and dimethoxyethane (Acros) freshly distilled from benzophenone ketyl were used. Dichloromethane (Merck) for organometallic synthesis as well as CD$_2$Cl$_2$ (Deutero GmbH) for NMR experiments were dried and kept over CaH$_2$. Toluene (Merck), n-octane (Merck), and hexanes (Merck) for organometallic synthesis were kept and distilled over Na/K alloy. Dichlorodimethylsilane (Merck) and methacrylic acid (Acros) were distilled before use.

2.a) 6-tert-Butyl-4-(3,5-di-tert-butylphenyl)-5-methoxy-2-methylindan-1-one

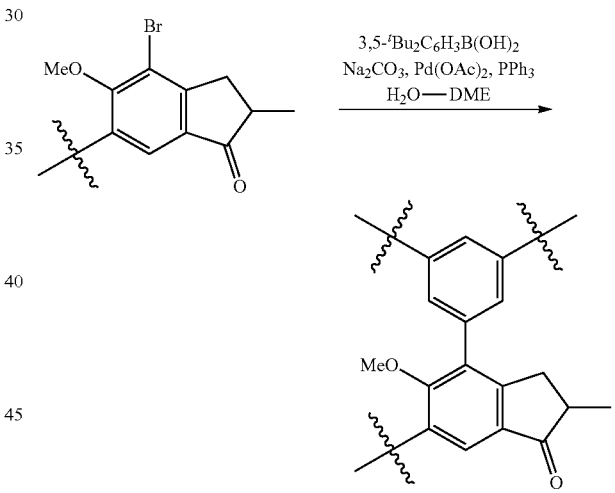

A mixture of 30.7 g (98.6 mmol) of 2-methyl-4-bromo-5-methoxy-6-tertbutylindanone, 30.6 g (128 mmol) 3,5-di-tert-butylphenylboronic acid, 29.7 g (280 mmol) of Na$_2$CO$_3$, 1.35 g (5.92 mmol; 6 mol. %) of Pd(OAc)$_2$, 3.15 g (11.8 mmol; 12 mol. %) of PPh$_3$, 130 ml of water, and 380 ml of 1,2-dimethoxyethane was refluxed for 12 h. Further on, the reaction mixture was quenched with water, solvents were evaporated. The residue was dissolved in 500 ml of dichloromethane, and this solution was washed by 500 ml of water. The organic layer was separated, the aqueous layer was additionally extracted with 100 ml of dichloromethane. The combined organic extract was dried over Na$_2$SO$_4$, then evaporated to dryness. The crude product isolated from the residue using flash chromatography on silica gel 60 (40-63 um, hexanes-dichloromethane=2:1, vol.) was then re-crystallized from n-hexane to give 18.5 g (43%) of a white solid.

Anal. calc. for C$_{29}$H$_{40}$O$_2$: C, 82.81; H, 9.59. Found: C, 83.04; H, 9.75.

¹H NMR (CDCl₃): δ 7.74 (s, 1H, 7-H in indan-1-one), 7.41 (t, J=1.6 Hz, 1H, 4-H in C₆H₃ᵗBu₂), 7.24 (d, J=1.6 Hz, 2,6-H in C₆H₃ᵗBu₂), 3.24 (s, 3H, OMe), 3.17 (dd, J=17.3 Hz, J=8.0 Hz, 1H, 3-H in indan-1-one), 2.64 (m, 1H, 2-H in indan-1-one), 2.47 (dd, J=17.3 Hz, J=3.7 Hz, 1H, 3-H' in indan-1-one), 1.43 (s, 9H, 6-ᵗBu in indan-1-one), 1.36 (s, 18H, ᵗBu in C₆H₃ᵗBu₂), 1.25 (d, J=7.3 Hz, 3H, 2-Me in indan-1-one).

2.b) 2-methyl-5-tert-Butyl-6-methoxy-7-(3,5-di-tert-butylphenyl)-1H-indene

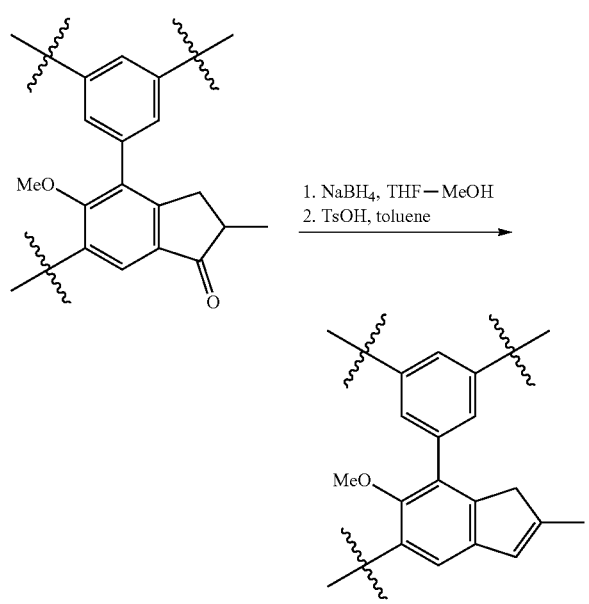

To a solution of 16.3 g (38.8 mmol) of 2-methyl-4-(3,5-di-tert-butylphenyl)-5-methoxy-6-tert-butyl-indan-1-one in 200 ml of THF cooled to 5° C. 1.47 g (38.9 mmol) of NaBH₄ was added. Further on, 80 ml of methanol was added dropwise to this mixture by vigorous stirring for ca. 7 h at 5° C. The resulting mixture was evaporated to dryness, and the residue was treated by 300 ml of dichloromethane and 300 ml of 2 M HCl. The organic layer was separated, the aqueous layer was additionally extracted with 100 ml of dichloromethane. The combined organic extract was evaporated to dryness to give a colorless oil. To a solution of this oil in 250 ml of toluene 0.1 g of TsOH was added, this mixture was refluxed with Dean-Stark head for 15 min and then cooled to room temperature using water bath. The resulting solution was washed by 10% aqueous Na₂CO₃. The organic layer was separated, the aqueous layer was extracted with 2×50 ml of dichloromethane. The combined organic extract was dried over K₂CO₃ and then passed through a short layer of silica gel 60 (40-63 μm). The silica gel layer was additionally washed by 100 ml of dichloromethane. The combined organic elute was evaporated to dryness to give 15.7 g (99%) of a white crystalline product which was further used without an additional purification.

Anal. calc. for C₂₉H₄₀O: C, 86.08; H, 9.96. Found: C, 86.26; H, 10.21.

¹H NMR (CDCl₃): δ 7.36 (t, J=1.8 Hz, 1H, 4H in C₆H₃ᵗBu₂), 7.33 (d, J=1.8 Hz, 2H, 2,6-H in C₆H₃ᵗBu₂), 7.21 (s, 1H, 4-H in indenyl), 6.44 (m, 1H, 3-H in indenyl), 3.17 (s, 3H, OMe), 3.14 (s, 2H, 1-H in indenyl), 2.06 (s, 3H, 2-Me in indenyl), 1.44 (s, 9H, 5-ᵗBu in indenyl), 1.35 (s, 18H, ᵗBu in C₆H₃ᵗBu₂). ¹³C{¹H} NMR (CDCl₃): δ 150.4, 145.2 (two resonances), 141.7, 140.9, 140.6, 137.3, 132.5, 126.9, 124.0, 120.1, 116.9, 60.2, 43.0, 35.2, 34.9, 31.5, 31.0, 16.7.

2. c) 2-Methyl-3,5, 6, 7-tetrahydro-s-indacen-1(2H)-one

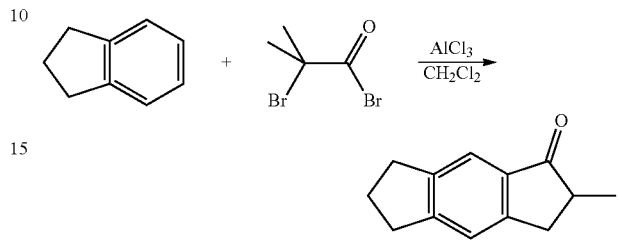

242 g (1.05 mol) of 2-bromo-2-methylpropionyl bromide was added dropwise over 15 min to a suspension of 333 g (2.5 mol) of AlCl₃ in 900 ml of dichloromethane cooled to −30° C. The resulting mixture was stirred for 15 min, and then 118 g (1.0 mol) of indane was added at the same temperature. The cooling bath was then removed, and the solution was stirred overnight at room temperature. The reaction mixture was poured into 2 kg of crushed ice, the organic phase was separated, and the aqueous phase was extracted by 3×500 ml of dichloromethane. The combined organic extract was washed by aqueous K₂CO₃, dried over K₂CO₃, passed through a short pad of silica gel 60 (40-63 μm). The elute was evaporated to dryness to give a yellow oil. This oil was distilled in vacuum to give 145 g (78%) of a slightly yellowish oil, b.p. 120-140° C./5 mm Hg. The so obtained 2-methyl-3,5,6,7-tetrahydro-s-indacen-1(2H)-one contaminated with ca. 15% of the angular isomer, i.e. 2-methyl-1,6,7,8-tetrahydro-as-indacen-3(2H)-one, was used without additional purification.

Anal. calc. for C₁₃H₁₄O: C, 83.83; H, 7.58. Found: C, 83.74; H, 7.39.

¹H NMR (CDCl₃): δ 7.54 (s, 1H, 8-H), 7.24 (s, 1H, 4-H), 3.30 (dd, J=16.6 Hz, J=7.3 Hz, 1H, 3-CHH'), 2.84-3.00 (m, 4H, 5-CH₂ and 7-CH₂), 2.63-2.74 (m, 1H, 2-H), 2.63 (dd, J=16.6 Hz, J=3.6 Hz, 1H, 3-CHH'), 2.10 (tt, 2H, 6-CH₂), 1.28 (d, J=7.4 Hz, 3H, 2-Me). ¹³C{¹H} NMR (CDCl₃): δ 208.84, 152.87, 152.50, 144.05, 135.06, 121.94, 119.10, 42.36, 34.65, 33.01, 31.95, 25.70, 16.40.

2.d) 4,8-Dibromo-2-methyl-3,5, 6, 7-tetrahydro-s-indacen-1(2H)-one

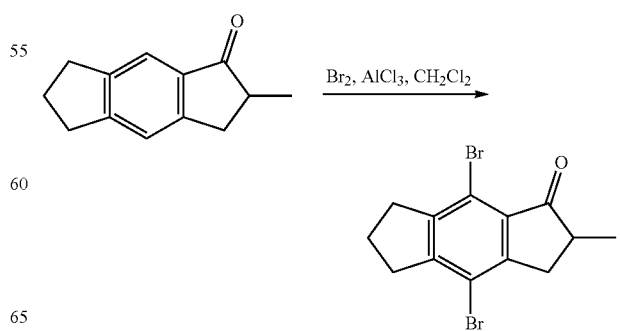

A solution of 141.7 g (760.8 mmol) of 2-methyl-3,5,6,7-tetrahydro-s-indacen-1(2H)-one (as prepared above, containing ca. 15% of the angular isomer) in 430 ml of dichloromethane was added dropwise for 0.5 h to a suspension of 260 g (1.95 mol, 2.56 eq.) of $AlCl_3$ in 700 ml of dichloromethane at −10° C. The reaction mixture was stirred for 10 min at this temperature, and then 1.3 g of iron powder was added. Further on, 250 g (1.56 mol, 2.06 eq.) of bromine was added dropwise for 1 h. The resulting mixture was stirred overnight at room temperature and then poured onto 2000 cm³ of crushed ice. The organic layer was separated; the aqueous layer was extracted with 3×300 ml of dichloromethane. The combined organic extract was washed with aqueous $K_2CO_3$, dried over $K_2CO_3$, passed through a short pad of silica gel 60 (40-63 μm), and then evaporated to dryness. The crude product (ca. 264 g) was recrystallised from 3000 ml of hot n-hexane to yield the title product of ca. 95% purity. This material was further recrystallized from 2400 ml of hot n-hexane. This procedure gave 117 g of 4,8-dibromo-2-methyl-3,5,6,7-tetrahydro-s-indacen-1(2H)-one. The mother liquors were evaporated to dryness, and one more portion of the title product was isolated from the residue by flash chromatography on silica gel 60 (40-63 μm). This procedure gave 109 g of 4,8-dibromo-2-methyl-3,5,6,7-tetrahydro-s-indacen-1(2H)-one and 29.2 g of the angular isomeric product, i.e. 4,5-dibromo-2-methyl-1,6,7,8-tetrahydro-as-indacen-3(2H)-one. Thus, the total yield of the title product was 226 g (87%).

4,8-Dibromo-2-methyl-3,5,6,7-tetrahydro-s-indacen-1(2H)-one.

Anal. calc. for $C_{13}H_{12}Br_2O$: C, 45.38; H, 3.52. Found: C, 45.64; H, 3.60.

$^1$H NMR ($CDCl_3$): δ 3.23 (dd, J=17.6 Hz, J=8.0 Hz, 1H, 3-CHH'), 3.04-3.12 (m, 4H, 5-$CH_2$ and 7-$CH_2$), 2.76 (m, 1H, 2-H), 2.54 (dd, J=17.6 Hz, J=3.7 Hz, 1H, 3-CHH'), 2.18 (quin, 2H, 6-$CH_2$), 1.32 (d, J=7.2 Hz, 3H, 2-Me). $^{13}$C{$^1$H} NMR ($CDCl_3$): δ 205.53, 154.61, 152.68, 147.07, 133.89, 117.86, 115.50, 43.17, 35.72, 34.88, 34.69, 23.30, 16.43.

4,5-Dibromo-2-methyl-1,6,7,8-tetrahydro-as-indacen-3(2H)-one.

Found: C, 45.50; H, 3.77.

$^1$H NMR ($CDCl_3$): δ 3.14 (dd, J=17.4 Hz, J=8.02 Hz, 1H, 3-CHH'), 3.06 (t, J=7.63 Hz, 2H, 6-$CH_2$), 2.97 (br. t, J=7.63 Hz, 2H, 8-$CH_2$), 2.74 (m, 1H, 2-H), 2.48 (dd, J=17.4 Hz, J=4.0 Hz, 1H, 3-CHH'), 2.20 (quin, J=7.63 Hz, 2H, 7-$CH_2$), 1.31 (d, J=7.43 Hz, 3H, 2-Me). $^{13}$C{$^1$H} NMR ($CDCl_3$): δ 205.13, 152.93, 150.21, 141.48, 133.91, 123.51, 119.50, 43.03, 36.86, 32.26, 31.20, 23.95, 16.48.

2.e) 4,8-Dibromo-1-methoxy-2-methyl-1,2,3,5,6,7-hexahydro-s-indacene

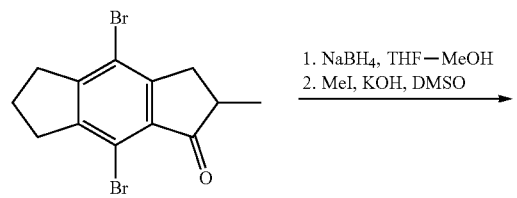

1. $NaBH_4$, THF—MeOH
2. MeI, KOH, DMSO

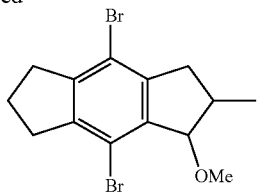

250 ml of methanol was added dropwise by vigorous stirring over 5 h to a mixture of 117 g (340 mmol) of 4,8-dibromo-2-methyl-3,5,6,7-tetrahydro-s-indacen-1(2H)-one and 19.3 g (0.51 mol) of $NaBH_4$ in 600 ml of THF at 0-5° C. This mixture was stirred overnight at room temperature and then evaporated to dryness. The residue was acidified by 2 M HCl to pH 5-6, and the formed 4,8-dibromo-2-methyl-1,2,3,5,6,7-hexahydro-s-indacen-1-ol was extracted with 1200 ml and then 2×200 ml of dichloromethane. The combined organic extract was dried over $Na_2SO_4$ and evaporated to dryness. The obtained white solid was dissolved in 800 ml of DMSO, 90 g (1.6 mol) of KOH and 110 g (0.775 mol) of methyl iodide was added. This mixture was stirred for 5 h at ambient temperature. The obtained solution was decanted from an excess of KOH, the latter was additionally washed by 3×350 ml of dichloromethane. The combined organic extract was washed with 3000 ml of water. The organic layer was separated, and the aqueous layer was extracted with 3×300 ml of dichloromethane. The combined organic extract was washed with 7×1500 ml of water, dried over $Na_2SO_4$, and then evaporated to dryness. This procedure gave 121 g (99%) of 4,8-dibromo-1-methoxy-2-methyl-1,2,3,5,6,7-hexahydro-s-indacene as a colorless thick oil slowly crystallized at room temperature. The final material is a mixture of two stereoisomers.

Anal. calc. for $C_{14}H_{16}Br_2O$: C, 46.70; H, 4.48. Found: C, 47.02; H, 4.69.

Syn-isomer: $^1$H NMR ($CDCl_3$): δ 4.60 (d, J=5.5 Hz, 1H, 1-H), 3.51 (s, 3H, OMe), 2.87-3.08 (m, 5H, 3-CHH', 5- and 7-$CH_2$), 2.74 (dd, J=15.9 Hz, J=9.7 Hz, 1H, 3-CHH'), 2.47 (m, 1H, 2-H), 2.09 (quin, J=7.4 Hz, 2H, 6-$CH_2$), 1.24 (d, J=6.85 Hz, 3H, 2-Me). $^{13}$C{$^1$H} NMR ($CDCl_3$): δ 146.01, 144.83, 144.22, 143.06, 116.75, 116.22, 86.86, 59.05, 40.65, 39.29, 35.44, 35.38, 23.45, 13.56. Anti-isomer. $^1$H NMR ($CDCl_3$): δ 4.44 (s, 1H, 1-H), 3.43 (s, 3H, OMe), 3.31 (dd, J=16.6 Hz, J=7.2 Hz, 1H, 3-CHH'), 2.95-3.05 (m, 4H, 5- and 7-$CH_2$), 2.57 (m, 1H, 2-H), 2.46 (d, J=16.6 Hz, 1H, 3-CHH'), 2.10 (quin, J=7.6 Hz, 2H, 6-$CH_2$), 1.05 (d, J=7.2 Hz, 3H, 2-Me). $^{13}$C{$^1$H} NMR ($CDCl_3$): δ 146.49, 144.67, 144.01, 140.71, 117.41, 116.70, 92.32, 56.83, 40.62, 36.89, 35.40, 35.23, 23.53, 19.81.

2.f) 4-Bromo-1-methoxy-2-methyl-1,2,3,5,6,7-hexahydro-s-indacene

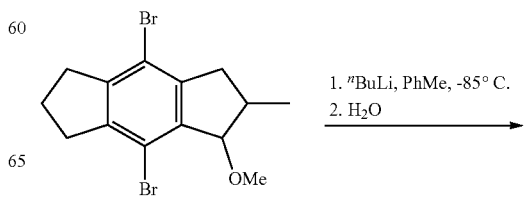

1. $^n$BuLi, PhMe, -85° C.
2. $H_2O$

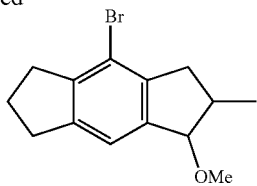

136 ml (340 mmol) of 2.5 M "BuLi in hexanes was added dropwise over a period of 30 min to a solution of 120.3 g (334 mmol) of 4,8-dibromo-1-methoxy-2-methyl-1,2,3,5,6,7-hexahydro-s-indacene in 650 ml of toluene cooled to −85° C. The resulting mixture was allowed to warm over 1 h to −30° C. and stirred at this temperature for 30 min. The reaction was quenched by 200 ml of water, yellowish organic layer was separated, and the aqueous layer was additionally extracted with 2×100 ml of dichloromethane. The combined organic extract was dried over $K_2CO_3$ and then passed through a short layer of silica gel 60 (40-63 μm). The silica gel layer was additionally washed with 50 ml of dichloromethane. The combined organic elute was evaporated to dryness, and the crude product was distilled under reduced pressure to give 87.2 g (92.9%) of 4-bromo-1-methoxy-2-methyl-1,2,3,5,6,7-hexahydro-s-indacene (bp 147-150° C./4 mm Hg) as a colorless liquid consisting of a mixture of two stereoisomers in a ca. 55:45 ratio.

Anal. calc. for $C_{14}H_{17}BrO$: C, 59.80; H, 6.09. Found: C, 59.99; H, 6.20.

$^1H$ NMR (CDCl$_3$): δ 7.13 (s, 1H, 7-H), 7.12 (s, 1H, 7-H), 4.51 (d, J=5.6 Hz, 1H, 1-H), 4.39 (d, J=3.8 Hz, 1H, 1-H), 3.42 (s, 3H, OMe), 3.38 (s, 3H, OMe), 3.17 (dd, J=16.4 Hz, J=7.6 Hz, 1H, 3-CHH'), 2.97 (t, J=7.4 Hz, 4H, 5- and 7-CH$_2$), 2.83 (m, 5H, 3-CHH', 5- and 7-CH$_2$), 2.55-2.69 (m, 2H, two 2-H), 2.51 (m, 1H, 3-CHH'), 2.38 (dd, J=16.4 Hz, J=4.8 Hz, 1H, 3-CHH'), 2.08 (quin, J=7.6 Hz, 4H, two 6-CH$_2$), 1.15 (d, J=7.1 Hz, 3H, 2-Me), 1.09 (d, J=6.8 Hz, 3H, 2-Me). $^{13}C\{^1H\}$ NMR (CDCl$_3$): δ 144.63, 144.43, 144.30, 144.00, 142.69, 142.08, 141.50, 141.17, 119.93, 119.77, 117.68, 91.90, 86.54, 56.74, 56.33, 39.32, 39.07, 38.41, 34.06, 33.74, 24.70, 19.42, 13.58.

2.g) 4-(3,5-Di-tert-butylphenyl)-1-methoxy-2-methyl-1,2,3,5,6,7-hexahydro-s-indacene

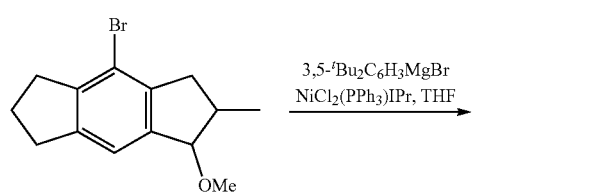

600 ml (270 mmol) of 0.45 M solution of 3,5-di-tert-butylphenylmagnesium bromide in THF was added in one portion to a mixture of 3.1 g (3.97 mmol) of NiCl$_2$(PPh$_3$)IPr and 56.4 g (201 mmol) of 4-bromo-1-methoxy-2-methyl-1,2,3,5,6,7-hexahydro-s-indacene. The resulting solution was refluxed for 2 hours. After cooling to room temperature, 150 ml of water was added to the reaction mixture and the main part of THF was distilled off in a rotary evaporator. 500 ml of dichloromethane and 1000 ml of 1 M HCl was added to the residue. Organic layer was separated and the aqueous layer was additionally extracted with 150 ml of dichloromethane. The combined organic extract was evaporated to dryness to give a red oil. The product was isolated by flash-chromatography on silica gel 60 (40-63 μm; eluent: hexanes-dichloromethane=2:1, vol., then 1:1, vol.). This procedure gave 73.7 g (94%) of 4-(3,5-di-tert-butylphenyl)-1-methoxy-2-methyl-1,2,3,5,6,7-hexahydro-s-indacene as colorless thick oil as a mixture of two stereoisomers.

Anal. calc. for $C_{14}H_{17}BrO$: C, 59.80; H, 6.09. Found: C, 60.10; H, 6.23.

Syn-isomer: $^1H$ NMR (CDCl$_3$): δ 7.34 (t, J=1.6 Hz, 1H, 4-H in 3,5-$^t$Bu$_2$C$_6$H$_3$), 7.23 (s, 1H, 7-H in indenyl), 7.16 (d, J=1.6 Hz, 2H, 2,6-H in 3,5-$^t$Bu$_2$C$_6$H$_3$), 4.49 (d, J=5.5 Hz, 1H, 1-H in indenyl), 3.45 (s, 3H, OMe), 2.96 (t, J=7.1 Hz, 2H), 2.6-2.92 (m, 4H), 2.54 (sept, J=6.5 Hz, 1H), 1.94-2.11 (m, 2H, 6-CH$_2$), 1.34 (s, 18H, 3,5-$^t$Bu$_2$C$_6$H$_3$), 1.09 (d, J=6.85 Hz, 3H, 2-Me). $^{13}C\{^1H\}$ NMR (CDCl$_3$): δ 149.97, 142.82, 142.58, 141.62, 140.12, 138.66, 136.28, 123.46, 120.18, 120.02, 86.31, 56.76, 39.56, 37.78, 34.88, 33.12, 32.63, 31.53, 26.00, 13.69. Anti-isomer: $^1H$ NMR (CDCl$_3$): δ 7.34 (t, J=1.76 Hz, 1H, 4-H in 3,5-$^t$Bu$_2$C$_6$H$_3$), 7.24 (s, 1H, 7-H in indenyl), 7.16 (d, J=1.76 Hz, 2H, 2,6-H in 3,5-$^t$Bu$_2$C$_6$H$_3$), 4.39 (d, J=3.91 Hz, 1H, 1-H in indenyl), 3.49 (s, 3H, OMe), 3.15 (dd, J=16 Hz, J=7.5 Hz, 1H, CHH'), 2.95 (t, J=7.24 Hz, 2H, 5-CH$_2$), 2.72-2.91 (m, 2H, 7-CH$_2$), 2.41-2.53 (m, 1H, 2-H), 2.3 (dd, J=16 Hz, J=4.8 Hz, 1H, CHH'), 1.95-2.11 (m, 2H, 6-CH$_2$), 1.34 (s, 18H, 3,5-$^t$Bu$_2$C$_6$H$_3$), 1.11 (d, J=7.0 Hz, 3H, 2-Me). $^{13}C\{^1H\}$ NMR (CDCl$_3$): δ 149.99, 143.29, 142.88, 140.91, 139.33, 138.62, 136.31, 123.39, 120.18, 120.01, 91.56, 56.45, 40.06, 37.89, 34.87, 33.09, 32.58, 31.52, 26.02, 19.31

2.h) 4-(3,5-Di-tert-butylphenyl)-6-methyl-1,2,3,5-tetrahydro-s-indacene

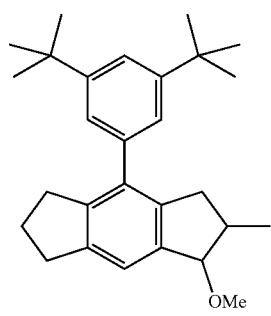

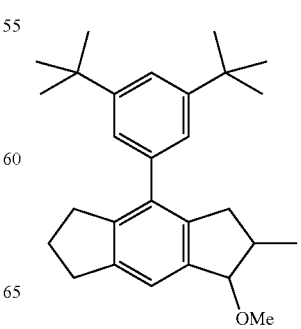

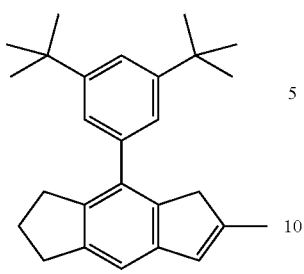

1.5 g of TsOH was added to a solution of 73.7 g (189 mmol) of 4-(3,5-di-tert-butylphenyl)-1-methoxy-2-methyl-1,2,3,5,6,7-hexahydro-s-indacene (as prepared above) in 700 ml of toluene, and the resulting solution was refluxed using Dean-Stark head for 15 min. After cooling to room temperature, the reaction mixture was washed with 200 ml of 10% aqueous $NaHCO_3$. The organic layer was separated, and the aqueous layer was additionally extracted with 2×150 ml of dichloromethane. The combined organic extract was evaporated to dryness to give a yellowish crystalline mass which was recrystallized from 250 ml of hot n-hexane to give 48.2 g of white crystalline product. The mother liquor was evaporated to dryness; the residue was recrystallized from 100 ml of n-hexane to give a second crop (13.3 g) of the product. Thus, the total yield of 4-(3,5-di-tert-butylphenyl)-6-methyl-1,2,3,5-tetrahydro-s-indacene isolated in this reaction was 61.5 g (91%).

Anal. calc. for $C_{27}H_{34}$: C, 90.44; H, 9.56. Found: C, 90.67; H, 9.74.

$^1$H NMR ($CDCl_3$): δ 7.45 (t, J=1.76 Hz, 1H, 4-H in 3,5-$^t$Bu$_2$C$_6$H$_3$), 7.33 (d, J=1.76 Hz, 2H, 2,6-H in 3,5-$^t$Bu$_2$C$_6$H$_3$), 7.20 (s, 1H, 8-H in indenyl), 6.56 (s, 1H, 7-H in indenyl), 3.28 (s, 2H, 5-$CH_2$), 3.06 (t, J=7.2 Hz, 2H, 3-$CH_2$), 2.90 (t, J=7.2 Hz, 2H, 1-$CH_2$), 2.17 (s, 3H, 6-$CH_2$), 2.13 (quin, J=7.2 Hz, 2H, 2-$CH_2$), 1.44 (s, 18H, 3,5-$^t$Bu$_2$C$_6$H$_3$). $^{13}$C{$^1$H} NMR ($CDCl_3$): δ 150.17, 145.58, 144.91, 143.02, 139.85, 139.15, 138.01, 135.26, 127.07, 123.19, 120.24, 114.82, 42.23, 34.92, 33.29, 32.27, 31.56, 25.96, 16.80.

2.i) Chloro[4-(3,5-di-tert-butylphenyl)-2-methyl-1,5,6,7-tetrahydro-s-indacen-1-yl]-dimethylsilane

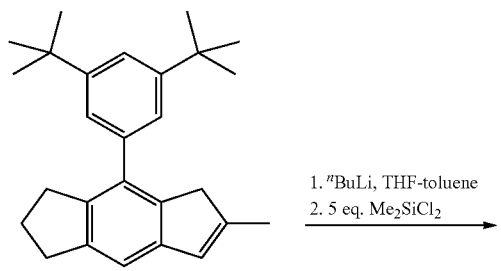

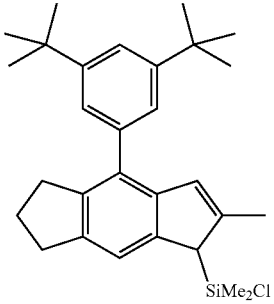

10.0 ml (25.0 mmol) of 2.5 M $^n$BuLi in hexanes was added at room temperature to a solution of 8.96 g (25.0 mmol) of 4-(3,5-di-tert-butylphenyl)-6-methyl-1,2,3,5-tetrahydro-s-indacene in a mixture of 200 ml of toluene and 7.5 ml of THF. This mixture was stirred for 2 h at 60° C. The resulting yellowish orange solution with a lot of yellow precipitate was cooled to −60° C., and 16.1 g (125 mmol, 5 eq.) of dichlorodimethylsilane was added in one portion. The resulting solution was stirred overnight at room temperature and then filtered through a glass frit (G3). The precipitate was additionally washed by 2×30 ml of toluene. The combined filtrate was evaporated to dryness to give chloro[4-(3,5-di-tert-butylphenyl)-2-methyl-1,5,6,7-tetrahydro-s-indacen-1-yl]dimethylsilane as a yellowish glass which was used without additional purification.

$^1$H NMR ($CDCl_3$): δ 7.39 (t, J=1.76 Hz, 1H, 4-H in 3,5-$^t$Bu$_2$C$_6$H$_3$), 7.32 (s, 1H, 8-H in indenyl), 7.25 (d, J=1.76 Hz, 2H, 2,6-H in 3,5-$^t$Bu$_2$C$_6$H$_3$), 6.60 (s, 1H, 3-H in indenyl), 3.59 (s, 1H, 1-H in indenyl), 2.94-3.08 (m, 2H, 7-$CH_2$), 2.83-2.99 (m, 2H, 5-$CH_2$), 2.33 (s, 3H, 2-Me in indenyl), 2.07 (quin, J=7.24 Hz, 2H, 6-$CH_2$), 1.39 (s, 18H, 3,5-$^t$Bu$_2$C$_6$H$_3$), 0.47 (s, 3H, SiMeMe'), 0.21 (s, 3H, SiMeMe'). $^{13}$C{$^1$H} NMR ($CDCl_3$): δ 150.02, 144.41, 142.13, 141.54, 139.92 (two resonances), 138.78, 131.41, 127.01, 123.94, 120.14, 118.64, 49.78, 34.89, 33.32, 32.51, 31.57, 26.04, 17.72, 1.26, −0.53.

2.j) [6-tert-Butyl-4-(3,5-di-tert-butylphenyl)-5-methoxy-2-methyl-1H-inden-1-yl][4-(3,5-di-tert-butylphenyl)-2-methyl-1,5,6,7-tetrahydro-s-indacen-1-yl]dimethylsilane

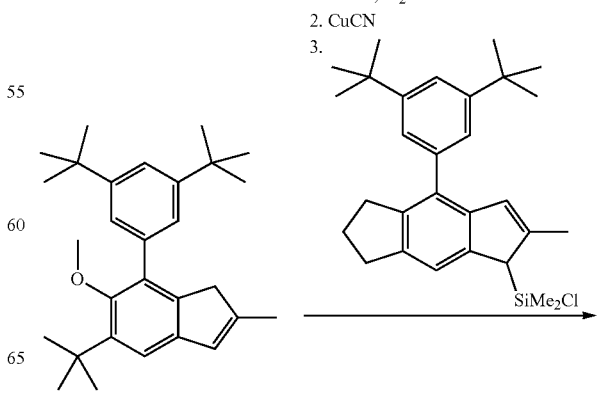

28

2.k) Dimethylsilanediyl[η⁵-6-tert-butyl-4-(3,5-di-tert-butylphenyl)-5-methoxy-2-methylinden-1-yl]-[η⁵-4-(3,5-di-tert-butylphenyl)-2-methyl-5,6,7-tri-hydro-s-indacen-1-yl]zirconium dichloride

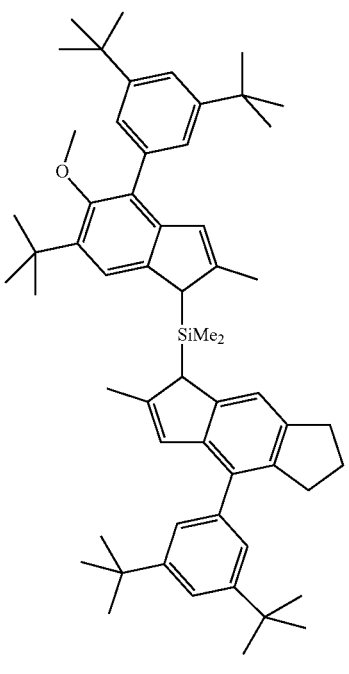

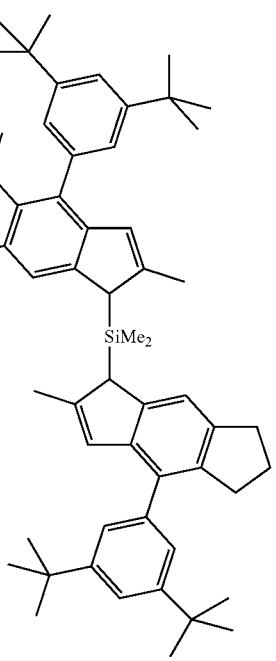

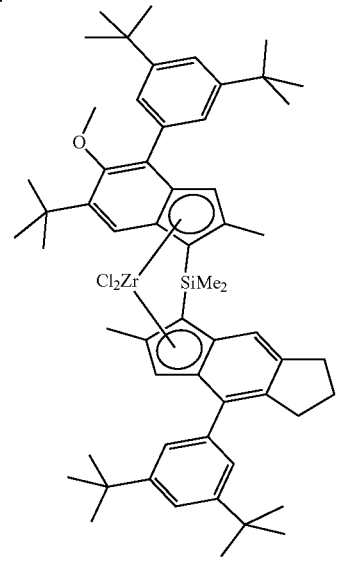

10.0 ml (25 mmol) of 2.5 M BuLi in hexanes was added in one portion to a solution of 10.1 g (25 mmol) of 5-tert-butyl-7-(3,5-di-tert-butylphenyl)-6-methoxy-2-methyl-1H-indene in 200 ml of ether at −50° C. This mixture was stirred overnight at room temperature, then the resulting yellow suspension was cooled to −50° C., and 250 mg of CuCN was added. The obtained mixture was stirred for 30 min at −25° C., then a solution of chloro[4-(3,5-di-tert-butylphenyl)-2-methyl-1,5,6,7-tetrahydro-s-indacen-1-yl]dimethylsilane (as prepared above, ~25 mmol) in 200 ml of ether was added in one portion. The formed mixture was stirred overnight at ambient temperature, then filtered through a pad of silica gel 60 (40-63 μm) which was additionally washed with 2×50 ml of dichloromethane. The combined filtrate was evaporated to dryness, and the residue was dried in vacuum at elevated temperature. This procedure gave 19.8 g (97%) of a yellowish glass of [6-tert-butyl-4-(3,5-di-tert-butylphenyl)-5-methoxy-2-methyl-1H-inden-1-yl][4-(3,5-di-tert-butylphenyl)-2-methyl-1,5,6,7-tetrahydro-s-indacen-1-yl]dimethylsilane (>90% purity on the evidence of NMR spectroscopy, a ca. 1:1 mixture of the stereoisomers) which was further used without an additional purification.

¹H NMR (CDCl₃): δ 7.51 (s), 7.33-7.42 (m), 7.22-7.31 (m), 6.60 (s), 6.53 (s), 3.74 (s), 3.70 (s), 3.68 (s), 3.21 (s), 3.19 (s), 2.83-3.03 (m), 2.22 (s), 2.19 (s), 1.99-2.11 (m), 1.45 (s), 1.43 (s), 1.36 (s), −0.16 (s), −0.17 (s), −0.21 (s).

19.3 ml (48.3 mmol) of 2.5 M ⁿBuLi in hexanes was added in one portion to a solution of 19.8 g (24.1 mmol) of [6-tert-butyl-4-(3,5-di-tert-butylphenyl)-5-methoxy-2-methyl-1H-inden-1-yl][4-(3,5-di-tert-butylphenyl)-2-methyl-1,5,6,7-tetrahydro-s-indacen-1-yl]dimethylsilane (as prepared above) in 300 ml of ether at −50° C. This mixture was stirred overnight at room temperature. The resulting light-orange solution was cooled to −50° C., and then 5.63 g (24.2 mmol) of ZrCl₄ was added. This mixture was stirred for 24 h at room temperature. The resulting orange suspension was evaporated to dryness. The residue was dissolved in 250 ml of warm toluene, and the resulting hot suspension was filtered through a glass frit (G4). On the evidence of NMR spectroscopy the obtained filtrate included a ca. 1 to 1 mixture of anti- and syn-zirconocenes. This filtrate was concentrated to ca. 90 ml. The pale orange crystalline solid precipitated from this solution overnight at room temperature was filtered off, washed with 2×20 ml of toluene, then 2×20 ml of n-hexane, and dried in vacuum. This procedure gave 4.23 g of a ca. 83 to 17 mixture of anti- and syn-zirconocenes as toluene monosolvates. The mother liquor was further evaporated to ca. 60 ml. The reddish solid precipitated from this solution for 3 h at room temperature was filtered off and dried in vacuum. This procedure gave 2.48 g of syn-zirconocene as toluene monosolvate. The mother liquor was evaporated to ca. 45 ml. The reddish solid precipitated from this solution for 1 h was filtered off and dried in vacuum. This procedure gave 3.52 g of a ca. 93 to 7 mixture of syn- and anti-zirconocenes as toluene monosolvates. Again, the mother liquor was evaporated to ca. 35 ml. Pale orange solid precipitated from this solution overnight at room temperature was filtered off and dried in vacuum. This procedure gave 4.72 g of anti-zirconocene as toluene monosolvate. Thus, the total yield of anti- and syn-zirconocenes (as toluene monosolvates) isolated in this synthesis was 14.95 g (58%).

Anti-isomer.

Anal. calc. for $C_{58}H_{76}Cl_2OSiZr×C_7H_8$: C, 72.85; H, 7.90. Found: C, 73.04; H, 8.08.

$^1$H NMR (CD$_2$Cl$_2$, −20° C.): δ 7.70 (br.s, 1H), 7.60 (s, 1H), 7.50 (s, 1H), 7.43 (s, 1H), 7.35-7.39 (m, 2H), 7.33 (t, J=1.84 Hz, 1H), 7.26 (s, 1H), 6.75 (s, 1H), 6.59 (s, 1H), 3.30 (s, 3H), 3.09-3.17 (m, 1H), 2.91-3.00 (m, 2H), 2.78-2.85 (m, 1H), 2.18 (s, 3H), 2.16 (s, 3H), 2.03-2.12 (m, 1H), 1.90-2.00 (m, 1H), 1.39 (s, 9H), 1.31-1.37 (m, 27H), 1.30 (s, 3H), 1.28 (s, 3H), 1.28 (s, 9H). $^{13}$C{$^1$H} NMR (CD$_2$Cl$_2$, −20° C.): δ 159.78, 150.82, 150.67, 150.06, 149.53, 144.49, 143.69, 142.90, 137.35, 135.70, 135.03, 133.54, 133.48, 132.88, 132.56, 127.36, 126.94, 124.67, 124.41, 124.03, 123.22, 122.90, 121.62, 121.02, 120.61, 120.55, 120.10, 117.81, 81.58, 81.01, 62.42, 35.68, 35.10, 34.98, 34.82, 33.12, 32.37, 31.48, 31.38, 30.29, 26.58, 18.38, 2.62, 2.54.[1] Resonances attributed to toluene were removed from this description of the NMR spectra.

[1]Resonances of some carbons in the aliphatic region coincided.

Syn-isomer.

Found: C, 73.15; H, 8.13.

$^1$H NMR (CD$_2$Cl$_2$, −20° C.): δ 7.82 (br.s, 1H), 7.71 (s, 1H), 7.51 (s, 1H), 7.41 (s, 1H), 7.35 (t, J=1.84 Hz, 1H), 7.33 (t, J=1.84 Hz, 1H), 7.29 (s, 1H), 7.24 (br.s, 1H), 6.74 (s, 1H), 6.53 (s, 1H), 3.11 (s, 3H), 3.04-3.10 (m, 1H), 2.76-2.91 (m, 3H), 2.39 (s, 3H), 2.37 (s, 3H), 1.99-2.06 (m, 1H), 1.63-1.75 (m, 1H), 1.44 (s, 3H), 1.38 (br.s, 9H), 1.34 (s, 9H), 1.33 (s, 9H), 1.32 (s, 9H), 1.31 (br.s, 9H), 1.21 (s, 9H). $^{13}$C{$^1$H} NMR (CD$_2$Cl$_2$, −20° C.): δ 158.77, 150.64, 150.10, 149.61, 143.44, 142.74, 141.74, 136.87, 136.30, 135.68, 135.29, 135.17, 134.33, 131.59, 126.50, 124.38, 124.08, 124.03, 123.65, 123.36, 121.55, 121.04, 120.90, 120.84, 120.15, 118.34, 82.86, 82.72, 62.12, 35.44, 35.12, 34.97, 34.79, 33.17, 32.48, 31.45, 31.42, 30.13, 26.77, 18.63, 18.55, 2.87, 2.68.[2] Resonances attributed to toluene were removed from this description of NMR spectra.

[1]Resonances of some carbons in the aliphatic region coincided.
[2]Resonances of some carbons coincided.

3. Complex 3-Zr: racemic dimethylsilylenebis-(2-i-butyl-4-(4'-tert-butylphenyl)-5,6,7-trihydro-s-indacen-1-yl)dichlorozirconium (C3-Zr) was prepared as described in the patent application WO2012/001051A1, catalyst 1.

b) Catalyst System

Comparative Example 1

Rac Complex 1-Zr was Used for Preparing Comparative Catalyst System CCS-1

C1-Zr has been prepared following the procedure described in WO 2013/007650 A1 for catalyst E2, by adjusting the metallocene and MAO amounts in order to achieve the Al/Zr ratios indicated in table 1. The complex has been off-line prepolymerized with propylene, following the procedure described in WO 2013/007650 A1 for catalyst E2P.

The Degree of off-line pre-polymerization 3.3 g/g
Al/Zr molar ratio in catalyst 431 mol/mol
Metallocene complex content of off-line prepolymerized catalyst 0.696 wt. %

Inventive Example 1

Rac Complex 1-Zr was Used for Preparing Inventive Catalyst System ICS-1

Step 1.

Inside the glovebox, 87.90 mg of Rac C1-Zr, prepared as described above was mixed with 4 ml of 30 wt.-% Chemtura MAO in a septum bottle and the solution was stirred for 60 minutes and then 105.2 mg of trityl tetrakis(pentafluorophenyl)borate was added. The mixture was left to react overnight at room temperature inside the glovebox. Then, in another septum bottle, 54 μL of dry and degassed FluorN 474 was mixed with 2 mL of 30 wt.-% Chemtura MAO.

The solutions were left under stirring overnight.

The following day, 4 mL of the MAO-metallocene-borate solution and 1 mL of the surfactant-MAO solution were successively added into a 50 mL emulsification glass reactor containing 40 mL of PFC at −10° C. and equipped with an overhead stirrer (stirring speed=600 rpm). Total amount of MAO is 5 mL (200 equivalents). A red emulsion formed immediately (measured emulsion stability=19 seconds) and stirred during 15 minutes at −10° C./600 rpm. Then the emulsion was transferred via a 2/4 teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.86 g of a red free flowing powder was obtained (Al-wt %=31.2 and Zr-wt %=0.49).

Off-line Prepolymerization Procedure

Off-line pre-polymerization experiment was done in a 125 mL pressure reactor equipped with gas-feeding lines and an overhead stirrer. Dry and degassed perfluoro-1.3-dimethylcyclohexane (15 cm$^3$) and 0.6855 g of the catalyst produced in the step 1, to be pre-polymerized, were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 bar and held constant by propylene feed via mass flow controller until the target degree of polymerization was reached (DP≈4.0). The reaction was stopped by flashing the volatile components. Inside glove box, the reactor was opened and the content poured into a glass vessel. The perfluoro-1.3-dimethylcyclohexane was evaporated until a constant weight was obtained to yield 3.42 g of the pre-polymerized ICS-1 catalyst.

Inventive Example 2

Rac Complex 1-Zr was Used for Preparing Inventive Catalyst System ICS-2

Inside the glovebox, 88.03 mg of complex 1-Zr was mixed with 5 ml MAO in a septum bottle and the solution was stirred for 60 minutes and then 105.15 mg of tritylBF20 was added. The mixture was left to react overnight at room temperature inside the glovebox. (preparation method according to above described step 1, no prepolymerization step)

Inventive Example 3

Rac Complex 2-Zr was Used for Preparing Inventive Catalyst System ICS-3

Inside the glovebox, 111.65 mg of complex 2-Zr was mixed with 5 ml MAO in a septum bottle and the solution was stirred for 60 minutes and then 105.15 mg of tritylBF20 was added. The mixture was left to react overnight at room temperature inside the glovebox. (preparation method according to above described step 1, no prepolymerization step)

Inventive Example 4

Rac Complex 3-Zr was Used for Preparing Inventive Catalyst System ICS-4

Inside the glovebox, 103.21 mg of complex 3-Zr was mixed with 5 ml MAO in a septum bottle and the solution was stirred for 60 minutes and then 105.15 mg of tritylBF20 was added. The mixture was left to react overnight at room temperature inside the glovebox. (preparation method according to above described step 1, no prepolymerization step)

Inventive Example 5

Rac Complex 3-Zr was Used for Preparing Inventive Catalyst System ICS-5

Inside the glovebox, 68.80 mg of complex 3-Zr was mixed with 4 ml MAO in a septum bottle and the solution was stirred for 60 minutes. The mixture was left to react overnight at room temperature inside the glovebox. (preparation method according to above described step 1, with prepolymerization step)

TABLE 1

| | | Catalyst System Composition | | |
|---|---|---|---|---|
| cat. | Metallocene | DofP[1] [g/g] | Al/Zr[2] [mol/mol] | B/Zr[3] [mol/mol] |
| CE-1 | C1-Zr | 3.3 | 431 | 0.0 |
| IE-1 | C1-Zr | 4.0 | 215 | 1.0 |
| IE-2 | C1-Zr | n.a | 200 | 1.0 |
| IE-3 | C2-Zr | n.a | 200 | 1.0 |
| IE-4 | C3-Zr | n.a | 200 | 1.0 |
| IE-5 | C3-Zr | 3.9 | 300 | 0.0 |

[1]Degree of off-line pre-polymerization
[2]Al/Zr molar ratio in catalyst
[3]B/Zr molar ratio in catalyst
n.a not applicable Polymerization In order to prove the suitability of the catalyst systems according to the present invention two kind of polymerizations were performed.

In Examples IE-1, IE-5 and CE-1 the polymerization reaction were carried out in a 480 mL pressure reactor at 110° C.

In Examples IE-2, IE-3 and IE-4 the polymerization reaction were carried out in Parallel Polymerization Reactors (PPR) (provided by Symyx) (10 mL Reactor Volume) at 190° C.

Polymerization Procedure IE-1, IE-5 and CE-1:

The Catalyst Systems ICS-1 and ICS-5 were Used and as Comparative Example the Catalyst System CCS-1 was Used (all Prepared as Described Above)

Ethylene/1-octene solution polymerizations were performed according to the following procedure in heptane at 110° C. without $H_2$.

First 1-octene was fed into the reactor by means of a Waters HPLC pump in the desired amounts, then 200 mL heptane by means of 10 mL syringe. The stirring speed was set to 150 rpm. 50 µmol of triethylaluminium (TEA) (as a scavenger) as a 0.5 mol/L solution in heptane was fed into the reactor. The reactor temperature was set to 110° C. The reactor was fed with ethylene up to the required pressure (P=20 bar) and the desired catalyst amount was injected at the polymerization temperature. The pressure was kept constant, feeding ethylene and after 20 min polymerization time the catalyst was killed by air addition and venting the reactors. The samples were stabilized with 2500 ppm Irganox B225 (dissolved in acetone).

TABLE 2

| results for ethylene/1-octene solution co-polymerization | | | |
|---|---|---|---|
| Example | IE-1 | IE-5 | CE-1 |
| Used Catalyst System | ICS-1* | ICS-5* | CCS-1* |
| Cat amount [mg] | 3.5 | 20 | 20.0 |
| Used 1-octene [g] | 19 | 12 | 12 |
| Yield [g] | 0.75 | 2.0 | 0.50 |
| Productivity in 20 min [kg/g MC] | 17.0 | 10.2 | 3.6 |
| Ethylene/1-octene in liq. Phase [wt/wt] | 0.44 | 0.76 | 0.76 |
| 1-Octene incorporation [wt % NMR] | 14.4 | 27.7 | n.m. |
| MWD | 3.5 | n.m. | n.m. |

*prepolymerized
n.m. not measured

As can be clearly seen from this table the productivity of the catalyst system either improves if the additional borate cocatalyst is used of if the special complexes, wherein both of $R^5$ and $R^6$ as well as $R^{5'}$ and $R^{6'}$ form an unsubstituted 5 membered ring condensed to the benzene ring of the indenyl moiety and $R^2$ and $R^{2'}$ are not a $C_1$-alkyl group, are used. The latter ones show additionally extremely high comonomer incorporation also without the additional boron cocatalyst.

PPR Polymerization Procedure and Characterisations for IE-2, IE-3 and IE-4

Pre-catalyst Preparation Procedure (Ternary System MC/MAO/tritylBF20):

Inside a glovebox, desired amount of metallocene was mixed with 5 ml MAO solution in a septum bottle and the solution was stirred for 60 minutes and then 105.15 mg of tritylBF20 was added. The mixture was left to react overnight at room temperature inside the glovebox. All catalysts were prepared according to the below recipe (Table 3).

TABLE 3 pre-catalyst preparation of the selected metallocenes.

| Example | IE-2 | IE-3 | IE-4 |
|---|---|---|---|
| C1-Zr [mg] | 88.03 | | |
| C2-Zr [mg] | | 111.65 | |
| C3-Zr [mg] | | | 103.21 |
| MAO [mg] | 1320 | 1320 | 1320 |
| TritylBF20 [mg] | 105.15 | 105.15 | 105.15 |
| Al/Zr | 200 | 200 | 200 |
| B/Zr | 1.0 | 1.0 | 1.0 |

MAO was used as 30% solution in toluene

Polymerization Procedure for PPR:

The selected catalysts were screened at 190° C., with polymerization solvent decane, at one MAO/Zr ratio (200), one B/Zr ratio (1.0) and 1-octene/ethylene ratios of 1 wt/wt ($C_8/C_2$=1.0 wt/wt).

Stock solutions of the metallocenes and co-catalysts (MAO and Borate) were prepared to be used for each set of reactions.

The vessels were loaded inside a glovebox utilizing a 3-axis liquid handling robot. A pre-weighed glass vial with stirring paddles was sealed and purged with nitrogen. A volume of about 4 mL of corresponding solvent (decane) was filled in each PPR reactor. Then, adequate amount of triethyl aluminium (TEA) as scavenger was added, along with precise volume of octene as co-monomer at room temperature. The ethylene pressure was set to 10 bar to check any leaks. Then, the temperature and pressure had been increased to the set value (T=190° C. and 24 bar) and once the steady state was reached, the corresponding volume of pre-activated catalyst as a slurry in toluene had been injected in the reactor to start the polymerization under mechanical stirring. The run was quenched with $CO_2$ after the set amount of ethylene uptake had been reached (20 min as a maximum run time). The glass vials had been dried by vacuum centrifuge and weighed.

TABLE 4

PPR experiments conditions for ethylene/1-octene solution co-polymerization

| | ICS-2 | ICS-3 | ICS-4 |
|---|---|---|---|
| Catalyst system [μl] | 51.8 | 35.7 | 38.7 |
| Used 1-octene [g] | 0.45 | 0.45 | 0.45 |
| Decane [g] | 3.14 | 3.16 | 3.16 |
| TEAL Scavenger [μmol] | 15.0 | 15.0 | 15.0 |

TABLE 5

PPR experiments results for ethylene/1-octene solution co-polymerization

| Example | MC | Complex amount [mg] | Quench time [min] | Productivity [gPE/mgCat] | Tm [° C.] | Tc [° C.] | 1-octene incorporation [wt % NMR] |
|---|---|---|---|---|---|---|---|
| IE-2 | Complex 1-Zr | 0.08 | 9.1 | 4.6 | n.m. | n.m. | 24.2 |
| IE-3 | Complex 2-Zr | 0.07 | 16.5 | 6.4 | 94 | 93 | 18.3 |
| IE-4 | Complex 3-Zr | 0.07 | 7.8 | 5.5 | 96 | 81 | 22.0 | n.m. not measured

The invention claimed is:
1. A catalyst system comprising:
(i) a metallocene complex of formula (I)

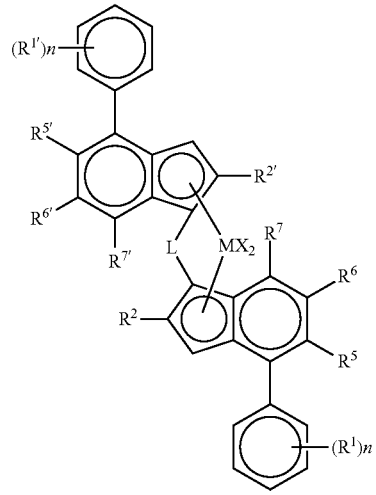

(I)

wherein
M is Zr;
each X is independently chlorine or a methyl radical;
L is a bridge of the formula —$SiR^8_2$—, wherein both $R^8$ are the same $C_1$-$C_{10}$-hydrocarbyl or $C_6$-$C_{10}$ aryl group;
n is 1 or 2;
$R^1$ and $R^{1'}$ are the same or are different and are a linear or branched $C_1$-$C_6$-alkyl group;
$R^2$ and $R^{2'}$ are the same or are different and are a $CH_2$-$R^9$ group, with $R^9$ being H or linear or branched $C_1$-$C_6$-alkyl group;
$R^5$ is H or a linear or branched $C_1$-$C_6$-alkyl group or an OR group, wherein R is a $C_1$-$C_6$-alkyl group;
$R^{5'}$ is a linear or branched $C_1$-$C_6$-alkyl group or an OR group, wherein R is a $C_1$-$C_6$-alkyl group;
$R^6$ and $R^{6'}$ are the same or are different and are H or a $C(R^{10})_3$ group, with $R^{10}$ being the same or different and $R^{10}$ is H or a linear or branched $C_1$-$C_6$-alkyl group;
or $R^5$ and $R^6$ and/or $R^{5'}$ and $R^{6'}$ taken together form an unsubstituted 4-7 membered ring condensed to the benzene ring of the indenyl moiety;

with the proviso that at least one of $R^5$ and $R^6$ or $R^{5'}$ and $R^{6'}$ together form an unsubstituted 4-7 membered ring condensed to a benzene ring of the indenyl moiety;

with the proviso that when $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group; and $R^7$ and $R^{7'}$ are the same or are different and are H or a linear or branched $C_1$-$C_6$-alkyl group;

(ii) an aluminoxane cocatalyst, wherein the aluminoxane cocatalyst is methyl aluminoxane; and (iii) a boron containing cocatalyst comprising an anion of formula:

(III)

where Z is an optionally substituted phenyl derivative, said substituent being a halo-$C_{1-6}$-alkyl or halo group.

2. The catalyst system according to claim 1, wherein in the formula (I)

$R^1$ and $R^{1'}$ are the same and are a linear or branched $C_1$-$C_6$-alkyl group;

$R^2$ and $R^{2'}$ are the same and are a $CH_2$-$R^9$ group, with $R^9$ being H or linear or branched $C_1$-$C_4$-alkyl group;

$R^5$ is H an OR group, wherein R is a $C_1$-$C_4$-alkyl group;

$R^{5'}$ is an OR group, wherein R is a $C_1$-$C_4$-alkyl group;

$R^6$ and $R^{6'}$ are the same or are different and are H or a $C(R^{10})_3$ group, with $R^{10}$ being the same or different and $R^{10}$ is a linear or branched $C_1$-$C_4$-alkyl group;

or $R^5$ and $R^6$ and/or $R^{5'}$ and $R^{6'}$ taken together form an unsubstituted 5-6 membered ring condensed to the benzene ring of the indenyl moiety;

with the proviso that at least one of $R^5$ and $R^6$ or $R^{5'}$ and $R^{6'}$ together form an unsubstituted 4-7 membered ring condensed to a benzene ring of the indenyl moiety;

with the proviso that when $R^5$ and $R^6$ as well as $R^{5'}$ and $R^{6'}$ taken together form an unsubstituted 5 membered ring condensed to the benzene ring of the indenyl moiety then $R^2$ and $R^{2'}$ are not a $C_1$-alkyl group; and $R^7$ and $R^{7'}$ are the same or are different and are H or a linear or branched $C_1$-$C_4$-alkyl group.

3. The catalyst system according to claim 1, wherein in the formula (I)

L is a bridge of the formula —$SiR^8_2$—, wherein both $R^8$ are the same $C_1$-$C_4$-hydrocarbyl or $C_6$-aryl group;

$R^1$ and $R^{1'}$ are the same and are a linear or branched $C_1$-$C_4$-alkyl group;

$R^2$ and $R^{2'}$ are the same and are a $CH_2$-$R^9$ group, with $R^9$ being H or $C_1$-$C_3$-alkyl group;

$R^{5'}$ and $R^{6'}$ form together an unsubstituted 5-6 membered ring condensed to the benzene ring of the indenyl moiety;

and the remaining residues of $R^5$ and $R^6$, are for $R^5$ an OR group, wherein R is a $C_1$-$C_4$-alkyl group and for $R^6$ a $C(R^{10})_3$ group, with $R^{10}$ being the same and $R^{10}$ is a $C_1$-$C_2$-alkyl group; and $R^7$ and $R^{7'}$ are the same and are H.

4. The catalyst system according to claim 1, wherein in the formula (I)

L is a bridge of the formula —$SiR^8_2$—, wherein both $R^8$ are the same $C_1$-$C_4$-hydrocarbyl or $C_6$-aryl group;

$R^1$ and $R^{1'}$ are the same and are a linear or branched $C_1$-$C_4$-alkyl group, $R^2$ and $R^{2'}$ are the same and are a $CH_2$-$R^9$ group, with $R^9$ being linear or branched $C_1$-$C_4$-alkyl group;

$R^5$ and $R^6$ and $R^{5'}$ and $R^{6'}$ form together an unsubstituted 5-6 membered ring condensed to the benzene ring of the indenyl moiety; and $R^7$ and $R^{7'}$ are the same and are H.

5. The catalyst system according to claim 1, wherein the metallocene of formula (I) is selected from racemic dimethylsilanediylbis[2-iso-butyl-4-(4-tert-butylphenyl)-5,6,7-trihydro-s-indacen-1-yl] zirconium dichloride or dimethyl, racemic dimethylsilanediyl[η$^5$-6-tert-butyl-4-(3,5-di-tert-butylphenyl)-5-methoxy-2-methylinden-1-yl][η$^5$-4-(3,5-di-tert -butylphenyl)-2-methyl-5,6,7-trihydro-s-indacen-1-yl] zirconium dichloride or dimethyl, dimethylsilanediylbis[2-methyl-4-(4' -tert-butylphenyl)-5,6,7-trihydro-s-indacen-1-yl] zirconium dichloride or dimethyl, dimethylsilanediylbis [2-methyl-4-(3,5-di-tert-butylphenyl)-5,6,7-trihydro-s-indacen-1-yl] zirconium dichloride or dimethyl, either in their syn or anti configuration.

6. A metallocene complex of formula (I), wherein

L is a bridge of the formula —$SiR^8_2$—, wherein both $R^8$ are the same $C_1$-$C_4$-hydrocarbyl or $C_6$-aryl group;

$R^1$ and $R^{1'}$ are the same and are a linear or branched $C_1$-$C_4$-alkyl group;

$R^2$ and $R^{2'}$ are the same and are a $CH_2$-$R^9$ group, with $R^9$ being H or a $C_1$-$C_3$-alkyl group;

$R^{5'}$ and $R^{6'}$ form together an unsubstituted 5-6 membered ring condensed to the benzene ring of the indenyl moiety;

and the remaining residues of $R^5$ and $R^6$, are for $R^5$ an OR group, wherein R is a $C_1$-$C_4$-alkyl group and for $R^6$ a $C(R^{10})_3$ group, with $R^{10}$ being the same and $R^{10}$ is a $C_1$-$C_2$-alkyl group; and $R^7$ and $R^{7'}$ are the same and are H.

7. A method of obtaining the catalyst system according to claim 1, comprising:

(a) forming a liquid/liquid emulsion system, said liquid/liquid emulsion system comprising a solution of the catalyst components (i) to (iii) dispersed in a solvent so as to form dispersed droplets; and (b) forming solid particles by solidifying said dispersed droplets.

8. The method according to claim 7, wherein the solid particles are prepolymerized in a step (c).

9. The catalyst system according to claim 1, the catalyst system being a non-supported catalyst system obtainable by contacting the metallocene of formula (I) as a solid or as a solution with the cocatalyst(s) previously dissolved in an aromatic solvent, or being obtainable by sequentially adding the catalyst components to the polymerization medium.

10. A process for the preparation of an ethylene copolymer, comprising: polymerizing ethylene and a $C_{4-10}$ alpha-olefin comonomer in a solution process at a temperature greater than 100° C. in the presence of a catalyst system comprising:

(i) a metallocene complex of formula (I)

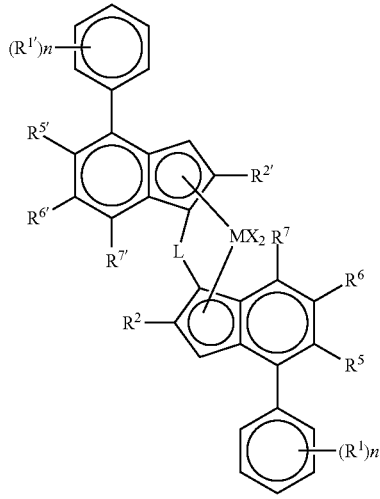

wherein
M is Zr;
each X is a sigma ligand;
L is a bridge of the formula —SiR$^8{}_2$—, wherein each R$^8$ is independently a C$_1$-C$_{20}$-hydrocarbyl, tri(C$_1$-C$_{20}$-alkyl)silyl, C$_6$-C$_{20}$-aryl, C$_7$-C$_{20}$-arylalkyl, or C$_7$-C$_{20}$-alkylaryl;
n is 0, 1, or 2;
R$^1$ and R$^{1'}$ are the same or are different and are a linear or branched C$_1$-C$_6$-alkyl group;
R$^2$ and R$^{2'}$ are the same or are different and are a CH$_2$-R$^9$ group, with R$^9$ being H or linear or branched C$_1$-C$_6$-alkyl group;
R$^5$ is H or a linear or branched C$_1$-C$_6$-alkyl group or an OR group, wherein R is a C$_1$-C$_6$-alkyl group;
R$^{5'}$ is a linear or branched C$_1$-C$_6$-alkyl group or an OR group, wherein R is a C$_1$-C$_6$-alkyl group;
R$^6$ and R$^{6'}$ are the same or are different and are H or a C(R$^{10}$)$_3$ group, with R$^{10}$ being the same or different and R$^{10}$ is H or a linear or branched C$_1$-C$_6$-alkyl group;
or R$^5$ and R$^6$ and/or R$^{5'}$ and R$^{6'}$ taken together form an unsubstituted 4-7 membered ring condensed to the benzene ring of the indenyl moiety;
with the proviso that when R$^5$ and R$^6$ as well as R$^{5'}$ and R$^{6'}$ taken together form an unsubstituted 5 membered ring condensed to the benzene ring of the indenyl moiety then R$^2$ and R$^{2'}$ are not a C$_1$-alkyl group; and
R$^7$ and R$^{7'}$ are the same or are different and are H or a linear or branched C$_1$-C$_6$-alkyl group;
(ii) an aluminoxane cocatalyst; and
(iii) a boron containing cocatalyst.

11. The process according to claim 10, wherein the polymerization is performed a) at a polymerization temperature of at least 110° C.,
b) a pressure in the range of 10 to 100 bar, and
c) in a liquid hydrocarbon solvent selected from the group of C$_{5-12}$-hydrocarbons,
which is unsubstituted or substituted by C$_{1-4}$ alkyl group.

12. The process according to claim 10, wherein the ethylene copolymer has
a) a comonomer content (measured with NMR) up to 40 wt %;
b) a density (measured according to ISO 1183-187) in the range of 0.850 g/cm$^3$ to 0.950 g/cm$^3$;
c) a Mw/Mn value (measured with GPC) of less than 5; and
d) a melting point (measured with DSC according to ISO 11357-3:1999) below 130° C.

13. The catalyst system according to claim 1, wherein the boron containing cocatalyst is triphenylcarbeniumtetrakis (pentafluorophenyl) borate, N,N-dimethylcyclohexylammoniumtetrakis(pentafluorophenyl)borate, N,N-dimethylbenzylammoniumtetrakis(pentafluorophenyl)borate, or N,N-dimethylaniliniumtetrakis(pentafluorophenyl)borate.

14. The process according to claim 10, wherein the catalyst system comprises:
(i) a metallocene complex of formula (I), wherein
each X is independently chlorine or a methyl radical;
L is a bridge of the formula —SiR$^8{}_2$—, wherein both R$^8$ are the same C$_1$-C$_{10}$-hydrocarbyl or C$_6$-C$_{10}$ aryl group;
n is 1 or 2;
R$^5$ is H or a linear or branched C$_1$-C$_6$-alkyl group or an OR group, wherein R is a C$_1$-C$_6$-alkyl group;
R$^{5'}$ is a linear or branched C$_1$-C$_6$-alkyl group or an OR group, wherein R is a C$_1$-C$_6$-alkyl group;
R$^6$ and R$^{6'}$ are the same or are different and are H or a C(R$^{10}$)$_3$ group, with R$^{10}$ being the same or different and R$^{10}$ is H or a linear or branched C$_1$-C$_6$-alkyl group;
or R$^5$ and R$^6$ and/or R$^{5'}$ and R$^{6'}$ taken together form an unsubstituted 4-7 membered ring condensed to the benzene ring of the indenyl moiety;
with the proviso that at least one of R$^5$ and R$^6$ or R$^{5'}$ and R$^{6'}$ together form an unsubstituted 4-7 membered ring condensed to a benzene ring of the indenyl moiety; and
with the proviso that when R$^5$ and R$^6$ as well as R$^{5'}$ and R$^{6'}$ taken together form an unsubstituted 5 membered ring condensed to the benzene ring of the indenyl moiety then R$^2$ and R$^{2'}$ are not a C$_1$-alkyl group;
(ii) an aluminoxane cocatalyst, wherein the aluminoxane cocatalyst is methyl aluminoxane; and
(iii) a boron containing cocatalyst comprising an anion of formula:

$$(Z)_4B^- \quad (III)$$

where Z is an optionally substituted phenyl derivative, said substituent being a halo-C$_{1-6}$-alkyl or halo group.

* * * * *